United States Patent
Chen et al.

(10) Patent No.: US 10,354,310 B2
(45) Date of Patent: Jul. 16, 2019

(54) MOBILE APPLICATION ENABLING PRODUCT DISCOVERY AND OBTAINING FEEDBACK FROM NETWORK

(71) Applicant: Dell Products L.P., Round Rock, TX (US)

(72) Inventors: Henry Haitian Chen, Austin, TX (US); Manish C. Mehta, Austin, TX (US)

(73) Assignee: Dell Products L.P., Round Rock, TX (US)

(*) Notice: Subject to any disclaimer, the term of this patent is extended or adjusted under 35 U.S.C. 154(b) by 211 days.

(21) Appl. No.: 13/891,721

(22) Filed: May 10, 2013

(65) Prior Publication Data

US 2014/0337165 A1  Nov. 13, 2014

(51) Int. Cl.
- *G06Q 30/00* (2012.01)
- *G06Q 30/06* (2012.01)
- *G06Q 50/00* (2012.01)

(52) U.S. Cl.
CPC ......... *G06Q 30/0631* (2013.01); *G06Q 50/01* (2013.01)

(58) Field of Classification Search
CPC .................................................. G06Q 30/00
See application file for complete search history.

(56) References Cited

U.S. PATENT DOCUMENTS

| | | |
|---|---|---|
| 6,321,221 B1 | 11/2001 | Bieganski |
| 7,647,309 B1 | 1/2010 | Bar |
| 7,689,432 B2 | 3/2010 | Gross |
| 7,818,399 B1 | 10/2010 | Ross, Jr. et al. |
| 8,032,506 B1* | 10/2011 | Gregov .................. G06Q 30/02 707/706 |
| 8,244,848 B1 | 8/2012 | Narayanan et al. |
| 8,543,457 B2 | 9/2013 | Staib et al. |
| 8,667,064 B2 | 3/2014 | Zuckerberg et al. |
| 8,935,604 B2 | 1/2015 | DeHaven et al. |
| 2002/0010625 A1* | 1/2002 | Smith ..................... G06Q 30/02 705/14.52 |
| 2005/0044485 A1 | 2/2005 | Mondry et al. |
| 2005/0204276 A1 | 9/2005 | Hosea et al. |

(Continued)

OTHER PUBLICATIONS

Matheny, M. (Jan. 30, 2012). Pinterest Tips—A Tutorial Guide for Beginners. The Yummy Life. Retrieved from http://www.theyummylife.com/Pinterest_tips.*

(Continued)

*Primary Examiner* — Abby J Flynn
(74) *Attorney, Agent, or Firm* — Terrile, Cannatti & Chambers; Stephen A. Terrile

(57) ABSTRACT

A system and method are disclosed automating the provision and consumption of social media product recommendations in a mobile environment. A user enters a physical site associated with a merchant that has implemented the Pick System and initiates a mobile Pick System application on their mobile device to perform mobile device Pick List management operations. The user then uses the mobile device to provide product identification data corresponding to a product displayed at the physical site, along with a request to associate the product with a predetermined Pick List, to the Picks System. In turn the Picks System processes the product identification data and the request to associate the product with the predetermined Pick List.

18 Claims, 29 Drawing Sheets

(56) References Cited

U.S. PATENT DOCUMENTS

| | | |
|---|---|---|
| 2007/0033532 A1 | 2/2007 | Lemelson |
| 2008/0133724 A1 | 6/2008 | Clark |
| 2008/0162268 A1 | 7/2008 | Gilbert |
| 2008/0243632 A1 | 10/2008 | Kane et al. |
| 2008/0281834 A1 | 11/2008 | Wu et al. |
| 2008/0306807 A1 | 12/2008 | Amento et al. |
| 2009/0043674 A1 | 2/2009 | Minsky et al. |
| 2009/0265251 A1 | 10/2009 | Dunlap et al. |
| 2009/0299981 A1 | 12/2009 | Nagasaka et al. |
| 2010/0030578 A1 | 2/2010 | Siddique et al. |
| 2010/0131384 A1 | 5/2010 | Chen et al. |
| 2010/0191582 A1 | 7/2010 | Dicker et al. |
| 2010/0321405 A1 | 12/2010 | MacInnes et al. |
| 2011/0066497 A1 | 3/2011 | Gopinath et al. |
| 2011/0093361 A1 | 4/2011 | Morales |
| 2011/0099523 A1 | 4/2011 | van Zee et al. |
| 2011/0196855 A1* | 8/2011 | Wable ............ G06F 17/30631 707/711 |
| 2011/0202400 A1 | 8/2011 | Bedard et al. |
| 2011/0202929 A1* | 8/2011 | Schleimer ........ G06F 17/30474 718/106 |
| 2011/0252343 A1 | 10/2011 | Broman et al. |
| 2011/0264736 A1 | 10/2011 | Zuckerberg et al. |
| 2011/0320276 A1 | 12/2011 | Ray et al. |
| 2012/0002601 A1* | 1/2012 | Underwood ............ H04L 51/04 370/328 |
| 2012/0311623 A1* | 12/2012 | Davis ............... H04N 5/765 725/18 |
| 2013/0067585 A1 | 3/2013 | Sterland et al. |
| 2013/0139073 A1* | 5/2013 | Crames ............. G06F 9/44505 715/760 |
| 2013/0191372 A1 | 7/2013 | Lee et al. |
| 2013/0218753 A1* | 8/2013 | Oikonomidis ......... G06Q 20/22 705/39 |
| 2013/0219520 A1 | 8/2013 | Atkinson et al. |
| 2013/0260727 A1* | 10/2013 | Knudson et al. .......... 455/414.1 |
| 2013/0290110 A1* | 10/2013 | LuVogt ................. G06Q 30/02 705/14.66 |
| 2013/0290444 A1* | 10/2013 | Billings ................. H04L 51/32 709/206 |
| 2014/0089135 A1* | 3/2014 | Linh ................. G06Q 30/0601 705/26.7 |
| 2014/0095463 A1* | 4/2014 | Pappas ............ G06F 17/30705 707/706 |
| 2014/0149259 A1 | 5/2014 | Grace et al. |
| 2014/0164401 A1 | 6/2014 | Kyaw et al. |
| 2014/0207609 A1* | 7/2014 | Earhart et al. ............... 705/26.7 |
| 2014/0258063 A1 | 9/2014 | Chourasia et al. |
| 2014/0279197 A1 | 9/2014 | Ainsworth, III et al. |
| 2014/0280054 A1 | 9/2014 | Karunakaran et al. |
| 2014/0307980 A1 | 10/2014 | Hilt |

OTHER PUBLICATIONS

Magestore, (Jul. 2, 2012), How to add a "Pin it" button (Pinterest) to product page? Retrieved May 31, 2017, from http://blog.magestore.com/how-to-add-a-pin-it-button-to-product-page/.*

Pinterest Website, Getting Started and Goodies. Retrieved May 31, 2017, from https://web.archive.org/web/20120504012224/http://pinterst.com/about/goodies/ and https://web.archive.org/web/20120504032342/http://pinterest.com/about/help/*

Anonymous, Display Ad 13—No Title, Apr. 10, 1894, New York Times (1857-1922).

* cited by examiner

MOBILE APPLICATION ENABLING PRODUCT DISCOVERY AND OBTAINING FEEDBACK FROM NETWORK

CROSS REFERENCE TO RELATED APPLICATIONS

U.S. patent application Ser. No. 13/891,649, entitled "On-Site Curation That Enables Scalable Peer Generated Content that is Visual and Inspires Discovery Anywhere" by inventors Christopher H. Howe, Joseph D. Langeway, Manish C. Mehta, and Rodney T. Whisnant, filed on May 10, 2013, describes exemplary methods and systems and is incorporated by reference in its entirety.

U.S. patent application Ser. No. 13/891,666, entitled "Automated Creation of Collages from a Collection of Assets" by inventors Rodney T. Whisnant, Joseph D. Langeway, and Christopher H. Howe, filed on Jun. 17, 2013, describes exemplary methods and systems and is incorporated by reference in its entirety.

U.S. patent application Ser. No. 13/891,684, entitled "Process To Display Picks On Product Category Pages" by inventors Rodney T. Whisnant, Joseph D. Langeway, and Christopher H. Howe, filed on May 10, 2013, describes exemplary methods and systems and is incorporated by reference in its entirety.

U.S. patent application Ser. No. 13/891,698, entitled "Forward Looking Recommendations Using Information Derived from a Plurality of Picks Generated by a Plurality of Users" by inventor Rodney T. Whisnant, filed on May 10, 2013, describes exemplary methods and systems and is incorporated by reference in its entirety.

U.S. patent application Ser. No. 13/891,710, entitled "Picks API Which Facilitates Dynamically Injecting Content onto a Web Page for Search Engines," by inventor Rodney T. Whisnant, filed on May 10, 2013, describes exemplary methods and systems and is incorporated by reference in its entirety.

BACKGROUND OF THE INVENTION

Field of the Invention

The present invention relates to the management of information handling systems. More specifically, embodiments of the invention provide a system and method for automating the provision and consumption of social media product recommendations in a mobile environment.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

These same information handling systems have played a key role in the rapid growth of electronic commerce on the Internet. In recent years, information handling systems have also been instrumental in the widespread adoption of social media into the mainstream of everyday life. Social media commonly refers to the use of web-based technologies for the creation and exchange of user-generated content for social interaction. As such, it currently accounts for approximately 22% of all time spent on the Internet.

One emerging aspect of electronic commerce is for users to use social media sites as a venue to review or recommend various products. Such reviews or recommendations may be provided in a variety of ways, including simple online forum or social media posts, to blog entries, video clips, and even dedicated websites. In some cases, the reviewer may provide a link to either a merchant's website, or a product details page, for the product they are reviewing or recommending. In other cases, a merchant may provide a link on their product details page to a reviewer or recommender.

However, such approaches typically require the viewer of the product reviews or recommendations to leave the social media site to visit the merchant's website or product details pages. Conversely, viewers of a merchant's product details pages may be required to leave to the merchant's website to view the reviews or recommendations of the product they were considering. Furthermore, the reviewer or recommender of the products is typically not provided the means to provide their reviews or recommendations on the merchant's product category pages from a mobile device.

SUMMARY OF THE INVENTION

A system and method are disclosed for automating the provision and consumption of social media product recommendations in a mobile environment. In various embodiments, a user enters a physical site associated with a merchant that has implemented the Pick System. The user then initiates a mobile Pick System application on their mobile device to perform mobile device Pick List management operations.

In various embodiments, the user uses a mobile device to provide product identification data corresponding to a product displayed at the physical site, along with a request to associate the product with a predetermined Pick List, to the Picks System. In turn the Picks System processes the product identification data and the request to associate the product with the predetermined Pick List. In certain embodiments, the product identification data may comprise stock keeping unit (SKU) data associated with the product or a photograph of the product. In various embodiments, the user submits a request to the Pick System to provide additional Pick Lists that contain the displayed product as well as other products. In response, the additional Pick Lists are displayed within the user interface of the user's mobile device.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system and method are disclosed for automating the provision and consumption of social media product recommendations in a mobile environment. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
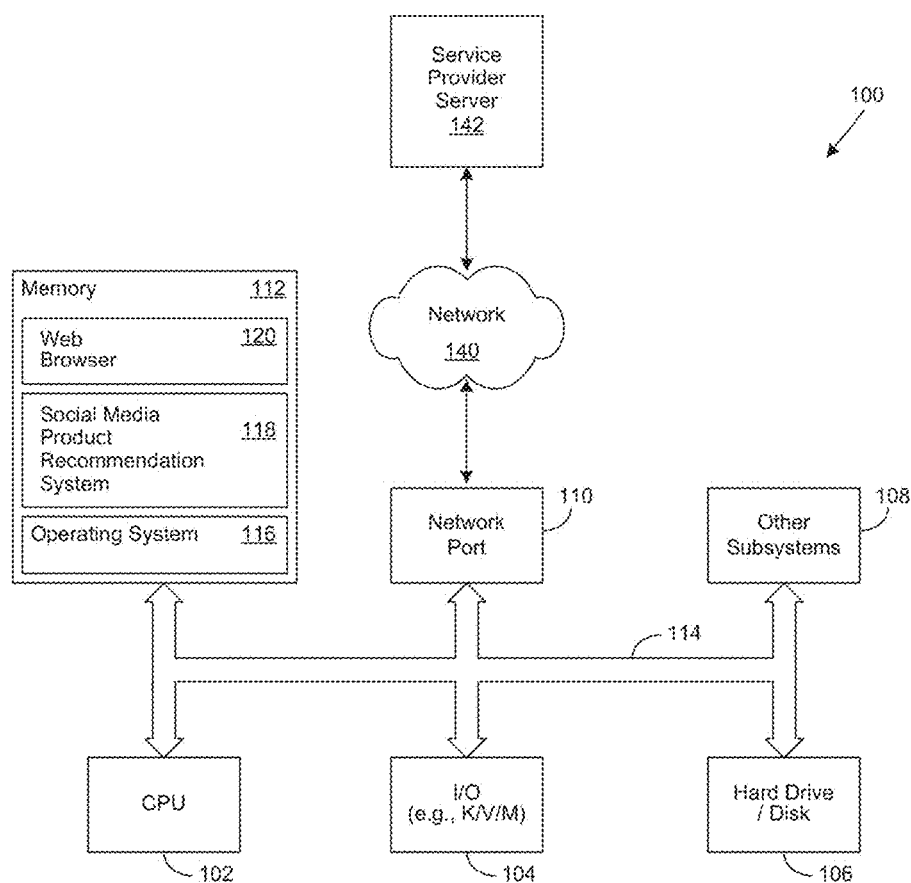
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a social media recommendation system 118 and a web browser 120. In one embodiment, the information handling system 100 is able to download the social media recommendation system 118 from the service provider server 142. In another embodiment, the social media recommendation system 118 is provided as a service from the service provider server 142.

Figure 2:
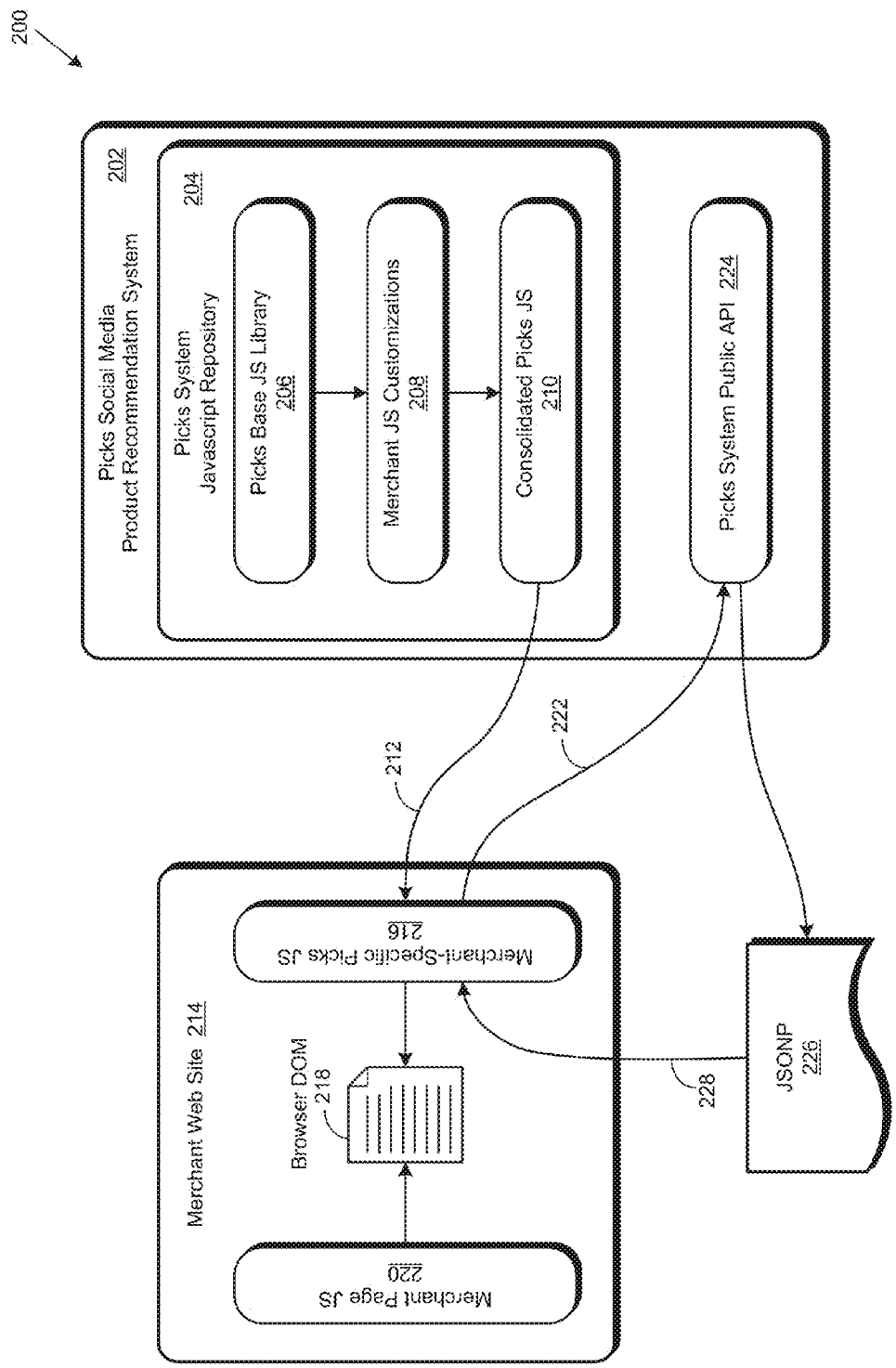
FIG. 2 is a simplified block diagram showing the implementation of a social media product recommendation system in an electronic commerce environment.

FIG. 2 is a simplified block diagram showing a social media product recommendation system 202 implemented in accordance with an embodiment of the invention in an electronic commerce environment 200. In various embodiments, the social media product recommendation system 202, referred to herein as a "Pick System," is implemented to allow users to create and manage collections of their favorite products. These product collections, variously referred to herein as a "Pick List," a "Pick Collage," or "Picks," can then be automatically published and displayed on related product details pages 214 in a merchant's website. In various embodiments, the Pick List, Pick Collage, or Picks are provided to the merchant's website from a server at a remote location. In certain embodiments, the Pick List, Pick Collage, or Picks are provided to the merchant's website by a service provider on an on-demand basis.

In various embodiments, visitors to these product details pages 214 can shop directly from a Pick List, share a Pick List through social media networks, or build a long-term social connection with the creator of a Pick List by "following" them. In certain of these embodiments, the visitors are likewise able to use such social media networks to "like" predetermined Pick Lists, Pick Collages, or Picks. As used herein, in the context of social media environments, the term "like" refers to the user expressing that he or she likes, enjoys or supports certain content.

As used herein, a Pick List refers to a pictorial grouping of products that a user has selected, assembled and named. In various embodiments, the data associated with a Pick List is managed by the Pick System 202 as described in greater detail herein. As used herein, a Pick Collage refers to a set of products that a user has selected from one or more Pick Lists, which are then pictorially arranged by the user for use as a background image within a user interface window of a display device. In certain embodiments, a Pick Collage may include a product that is not a member of a Pick List associated with the Pick System user.

In various embodiments, one or more Pick Collages are implemented to allow Pick System users to choose a different visual layout for products in existing Pick Lists. In certain embodiments, various Pick Collage templates are provided, which offer different backgrounds and positioning to give the Pick Collage creator control over which products are displayed in which positions. In various embodiments, a Pick System user is able to select from a plurality of Pick Collage templates, each of which includes various design parameters, such as a visual layout, a background image, a color palette, and a typeface.

In certain embodiments, Pick Collages are displayed on a merchant's website product details pages, the Pick Collage creator's Picks user profile, or both. In various embodiments, a predetermined Pick List displays the products in a simple layout while a Pick Collage displays the same products in a more creative rendering. As such, Pick Collages allow Pick Collage creators to select products from one or more of their existing Pick Lists, select an existing Pick Collage design template, and then populate the selected Pick Collage design template with the selected products.

As used herein, a "Pick Set" refers to a grouping of two or more Pick Lists. As used herein, a "Pick List preview" refers to the display of a predetermined number of products that were most recently added to one or more target Pick Lists. In one embodiment the predetermined number of products is determined by the Pick System user. In another embodiment, the predetermined number of products is determined by an administrator of the merchant's website. In yet another embodiment, the predetermined number or products is different for various pages within the merchant's website. In still another embodiment, the one or more target Pick Lists are selected by the Pick System user. In one embodiment, the one or more target Pick Lists are a predetermined number of Pick Lists that a Pick System user has most recently interacted with.

As used herein, a "Picks Collage detail page" refers to the display of product details contained in a selected Pick Collage. In various embodiments, the Picks Collage detail page provides predetermined functionalities. As used herein, an "anonymous user" refers to a user who either does not have a client login identifier or a user that has a client login identifier but is not presently logged-in to the Pick System.

In various embodiments, the Pick System 202 is implemented to reduce the effort required for a merchant to integrate the functionality of the Pick System 202 within their website. In various embodiments, software customization tasks are performed either by an operator of the Pick System 202 or a third party integration team. Another aspect is that these third parties are able to maintain and enhance the feature set provided to the merchant without requiring the merchant to perform any additional integration or software upgrade tasks once the basic integration has been established.

In various embodiments, these objectives are achieved, in part, by integrating Pick System functionality into the merchant's website by including a merchant-specific script code file, such as a Picks Javascript (JS) file 216 in predetermined pages, such as product details pages, of the merchant's website 214. In various embodiments, the merchant-specific Picks JS file 216 is dynamically assembled. As a result, the merchant-specific Picks JS file 216 has the ability to change, capture data, and inject information into the merchant's website in various ways. This dynamic JS approach, coupled with content injection into a web page, is implemented in various embodiments as a "broadcast" paradigm depicted in FIG. 2.

In various embodiments, a consolidated script code file, such as the consolidated Picks JS file 210 included in a merchant's web page is dynamically assembled at runtime by combining a general script code base library, such as the general Pick System base JS library 206, with a series of script code customizations, such as JS customizations 208, that are generated to support merchant-specific aspects of the integration. In various embodiments, the Pick System base JS library 206, the merchant JS customizations 208, and the consolidated Picks JS file 210 are stored and maintained in a Pick System JS repository 204. In various embodiments, the resulting consolidated Picks JS file 210 is implemented and maintained 212 as a merchant-specific Picks JS file 216 in the merchant's website 214. In various embodiments, the consolidated Picks JS file 210 is implemented and maintained 212 as a merchant-specific Picks JS file 216 either by the owner or an operator of the merchant's website 214, the operator of the Pick System 202, or a third party.

In various embodiments, the merchant-specific Picks JS file 216 is implemented to make dynamic HTTP requests 222 to the Pick System 202 to record or retrieve additional information through a Pick System Public Application Programming Interface (API) 224. In certain of these embodiments, the Pick System 202 provides a response 228 to the requests with predetermined data. In at least one embodiment, JS Object Notation with Padding (JSONP) 226 is used to perform the response. In one embodiment, this data is used in a target page of the merchant's website 214. In another embodiment, the data is used to trigger additional types of requests back to the Pick System 202. In various embodiments, the data is formatted and dynamically into the target page of the merchant's website 214 as it is received from the Pick System 202 by manipulating the browser's Document Object Model (DOM) 218. In one embodiment, changes to the merchant page JS 220 are kept in sync with the merchant JS customizations 208.

Figure 3:
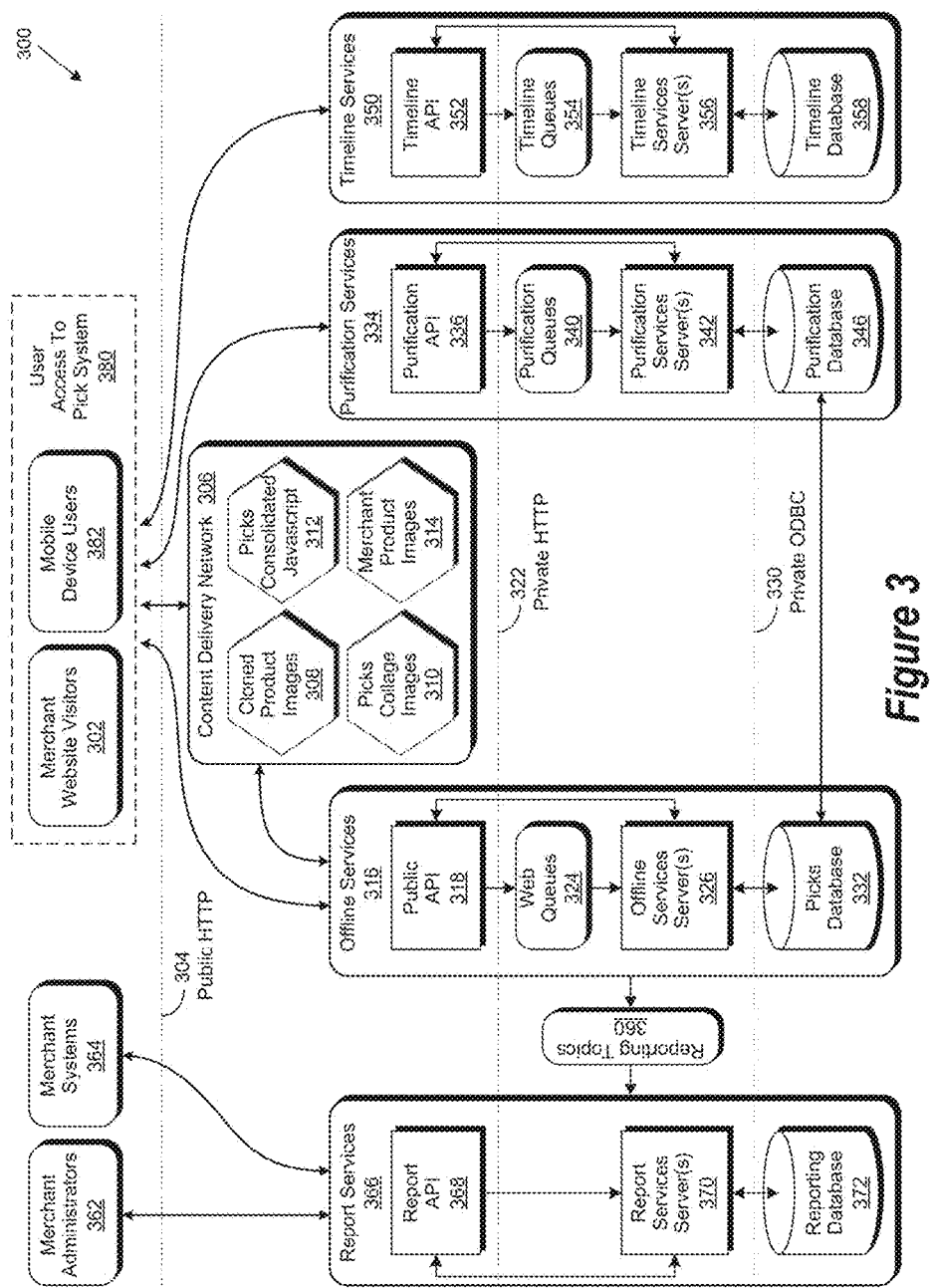
FIG. 3 is a simplified block diagram showing a high-level architecture of a social media product recommendation system.

FIG. 3 is a simplified block diagram showing a high-level architecture of a social media product recommendation system 300 implemented in accordance with an embodiment of the invention. In various embodiments, the social media product recommendation system 300, referred to herein as a "Pick System," is implemented in a cloud computing environment familiar to skilled practitioners of the art. In this embodiment, the Pick System 300 includes a content delivery network (CDN) 306, an offline services system 316, a purification services system 334, a timeline services system 350, and a report services system 366. As shown in FIG. 3, user access to the Pick System 380 includes visitors to a merchant's website 302 and mobile device users 382.

In various embodiments, a mobile Pick System application is implemented on a mobile device associated with a Pick System user. In these embodiments, certain predetermined Pick System operations are performed by the Pick System user's mobile device as described in greater detail herein. In one embodiment, the mobile Pick System application is specific to a predetermined merchant that has implemented the Pick System, such as the merchant associated with the physical site. In another embodiment, the mobile Pick System application is configured to be specific to a predetermined set of merchants that have implemented the Pick System. In yet another embodiment, the mobile Pick System application is configured to support Pick System operations with any merchant that has implemented the Pick System 300.

As used herein a mobile device refers to a mobile device refers to wireless devices such as mobile telephones, smart phones, personal digital assistants (PDAs), tablet computers, handheld or laptop computers, and similar devices that have telecommunications capabilities. In various embodiments, the mobile device is used to exchange information between the Pick System 300 and a Pick System user through the use of a network. In various embodiments, the network may be a public network, such as the Internet, a physical private network, a virtual private network (VPN), or any combination thereof. The combination of the mobile device and the network may be considered a mobile environment.

In certain embodiments, the network may be a wireless network, including a personal area network (PAN), based on technologies such as Bluetooth or Ultra Wideband (UWB). In various embodiments, the wireless network may include a wireless local area network (WLAN), based on variations of the IEEE 802.11 specification, often referred to as WiFi. In certain embodiments, the wireless network may include a wireless wide area network (WWAN) based on an industry standard including two and a half generation (2.5G) wireless technologies such as global system for mobile communications (GPRS) and enhanced data rates for GSM evolution (EDGE). In various embodiments, the wireless network may include WWANs based on existing third generation (3G) wireless technologies including universal mobile telecommunications system (UMTS) and wideband code division multiple access (W-CDMA). Other embodiments may include the implementation of other 3G technologies, including evolution-data optimized (EVDO), IEEE 802.16 (WiMAX), wireless broadband (WiBro), high-speed downlink packet access (HSDPA), high-speed uplink packet access (HSUPA), and emerging fourth generation (4G) wireless technologies. Skilled practitioners of the art will realize that many such embodiments are possible and the foregoing is not intended to limit the spirit, scope or intent of the invention.

In various embodiments, the visitors to a merchant's website 302 and the mobile device users 382 are also able to access the CDN 306, the offline services system 316, the purification services system 334, and the timeline services system 350 through a public Hypertext Transfer Protocol (HTTP) 304 environment, such as the public Internet. As also shown in FIG. 3, the merchant's website administrators 362, and associated merchant systems 364, are likewise able to access the report services system 366 through the public HTTP environment 304.

In various embodiments, the offline services system 316, the purification services system 334, the timeline services system 350, and report services system 366 respectively include a public Application Program Interface (API) 318, a purification API 336, a timeline API 352, and a report API 368. In various embodiments, the public API 318, the purification API 336, and the timeline API 352 manage HTTP requests originating from browsers used by visitors to a merchant's website 302 that has implemented merchant-specific Picks Javascript (JS) files that are described in greater detail herein. In various embodiments, the public API 318 also manages HTTP requests from the content delivery network 306. In various embodiments, the report API 352 manages HTTP requests from the merchant's website administrators 362 and associated merchant systems 364.

In various embodiments, the content served by the Pick System 300 to the public HTTP environment is the same, or changes infrequently, regardless of which user is accessing the content. In certain of these embodiments, this content is cached in, and served from, a CDN 306, such as the CloudFront® CDN 306 provided by Amazon® Web Services (AWS) to reduce delivery latency. In various embodiments, the CDN 306 includes cloned product images 308, Pick Collage images 310, consolidated Picks JS 312, and merchant product images 314. As used herein, a cloned product image 308 refers to a duplicated client product image 314. In one embodiment, a merchant product image 314 is resized to generate a cloned product image 302.

In one embodiment, a request is received for a cloned product image 308, a Pick Collage image 310, consolidated Picks JS 312, or a merchant product image 314 that is not currently present in the CDN 306. In this embodiment, the CDN 306 submits a request to the public API 318 to dynamically build and retrieve the requested content. In one embodiment, a request is received for a merchant product image 314. In this embodiment, the public API 318 will in turn submit a request to the merchant's website to retrieve the image and then save it in the CDN 306 for subsequent use.

In various embodiments, the purification services system 334 is implemented to perform purification services on content submitted by Pick System users to ensure that inappropriate content (e.g., profanity, derogatory comments, etc.) is not presented in the merchant's website. As shown in FIG. 3, the purification services system 334 includes a purification API 336, which submits requests for purification services to one or more purification queues 340, which in turn manage submission of the purification service requests to one or more purification services servers 342. The one or more purification services servers 356 then use purification data stored in the purification database 346 to perform purification services on content stored in the Picks database 332.

As likewise shown in FIG. 3, the timeline services system 350 includes a timeline API 352, which submits requests for timeline information to one or more time queues 354, which in turn manage submission of the timeline information requests to one or more timeline services servers 356. The one or more timeline services servers 356 then process timeline data stored in the timeline database 358 to generate a timeline information response, which in turn is provided to the timeline API 352.

In various embodiments, the timeline services system 350 is implemented physically and logically separate from other components of the Pick System 300 to offset the computationally intensive effects of generating and providing timeline information. In certain of these embodiments, timeline services are exposed in a traditional HTTP manner, similar to the public API 318. However, the timeline services are not accessed through the public HTTP environment 304 in these embodiments. Instead, when a timeline information request is received by the public API 318, it makes a private HTTP request 322 to the timeline services system 350 to either request or record timeline information.

In various embodiments, the offline services system 316 is implemented to perform Pick System 300 processes associated with services that do not need to be provided in real-time. In certain of these embodiments, the Pick System 300 services are provided asynchronously. Examples of such processes include the calculation of timeline data or aggregation of reporting statistics.

As shown in FIG. 3, the offline services system 316 includes a public API 318, which submits requests for offline services to one or more web queues 324, which in turn manage submission of the offline service requests to one or more offline services servers 326. The one or more offline services servers 326 then processes various data elements stored in the Picks database 332 to generate an offline services response, which in turn is provided to the public API 318.

In various embodiments, a report services system 366 is implemented to allow merchant administrators 362 and merchant systems 364 to access various information related to data that the Pick System 300 collects. Examples of such data include the top Pick Lists associated with the merchant's website, most popular products, most-liked users, etc. As shown in FIG. 3, the report services system 366 includes a report API 368, which submits requests for report services to one or more report services servers 370. The one or more report services servers 370 then processes various data elements stored in the reporting database 372 to generate a report services response, which in turn is provided to the report API 368.

In one embodiment, the report API 368 provides merchant website administrators 362 a public HTTP 304 interface, which can be used with their browsers to browse information stored in the reporting database 372. In another embodiment, the report API 368 provides merchant systems 364, such as business intelligence systems or data warehouses, a public HTTP 304 interface to dynamically submit report services requests to the report services servers 370. In various embodiments, the offline services system 316 provides various Pick System 300 data in the form of reporting topics 360 via a private HTTP interface to the report services system 366.

In various embodiments, Pick System 300 data, with the exception of merchant product images 314, is stored in the Picks database 332, the timeline database 358, and the reporting database 372, which are implemented in a private Open Database Connectivity (ODBC) environment 330. In certain embodiments, the Picks database 332 includes merchant configuration details, registered user records, Pick Lists, and Pick Collages. In various embodiments, server-based scraping is implemented to mitigate potential issues with inappropriate content being injected into the Pick System 300, and by extension, the Picks database 332, by malicious users.

In various embodiments, a database sharding approach is implemented for large data sets stored in the Picks database 332. As used herein, a database shard is a horizontal partition in a database or search engine. Each individual partition is referred to as a shard or database shard. Horizontal partitioning is a database design principle whereby rows of a database table are held separately, rather than being split into columns. Each partition forms part of a shard, which may in turn be located on a separate database server or physical location. In at least one embodiment, the Picks Database 332 is implemented using a NoSQL database.

Figure 4:
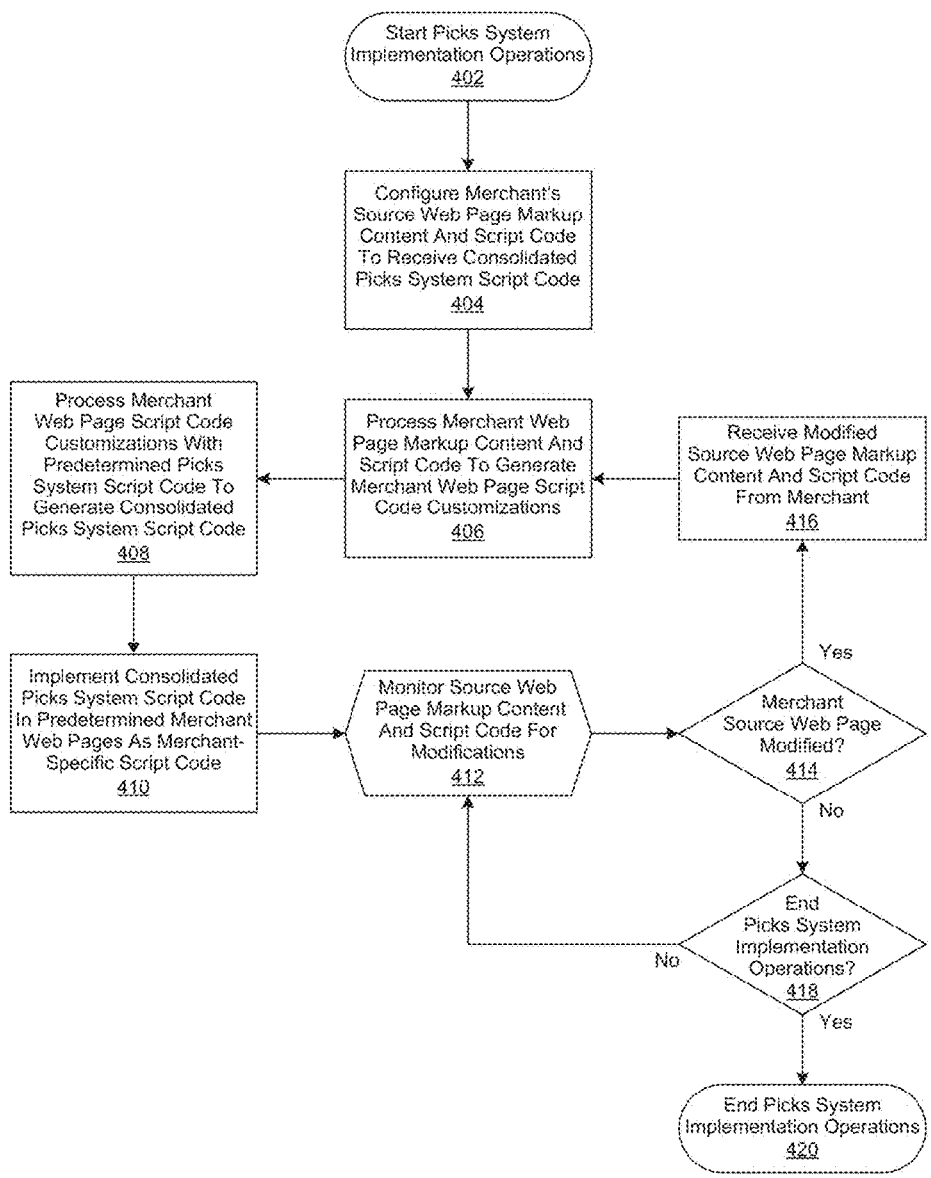
FIG. 4 is a generalized flowchart of the implementation of a social media product recommendation system in an electronic commerce environment.

FIG. 4 is a generalized flowchart of the implementation of a social media product recommendation system in accordance with an embodiment of the invention in an electronic commerce environment. In this embodiment, operations to implement a social media product recommendation system, herein referred to as a "Pick System," are begun in step 402, followed by configuring a merchant's source web page markup content and script code to receive consolidated Pick System script code in step 404. In various embodiments, the source web page markup content includes Hypertext Markup Language (HTML) content. In various embodiments, the source script code includes Javascript (JS) code.

Then, in step 406, the merchant's source web page markup content and script code are processed to generate merchant web page script code customizations. The resulting merchant web page script code customizations are then processed in step 408 with predetermined Pick System script code to generate consolidated Pick System script code. The resulting consolidated Pick System script code is then implemented in predetermined merchant web pages as merchant-specific script code in step 410.

The merchant's source web page markup content and script code is then monitored in step 412 for the occurrence of modifications, followed by a determination being made in step 414 whether any modifications have occurred. If so, then the modified web page markup content and script code is received from the merchant's web site in step 416 and the process is continued, proceeding with step 406. Otherwise, a determination is made in step 418 whether to end Pick System implementation operations. If not, then the process is continued, proceeding with step 412. Otherwise, Pick System implementation operations are ended in step 420.

Figure 5A:
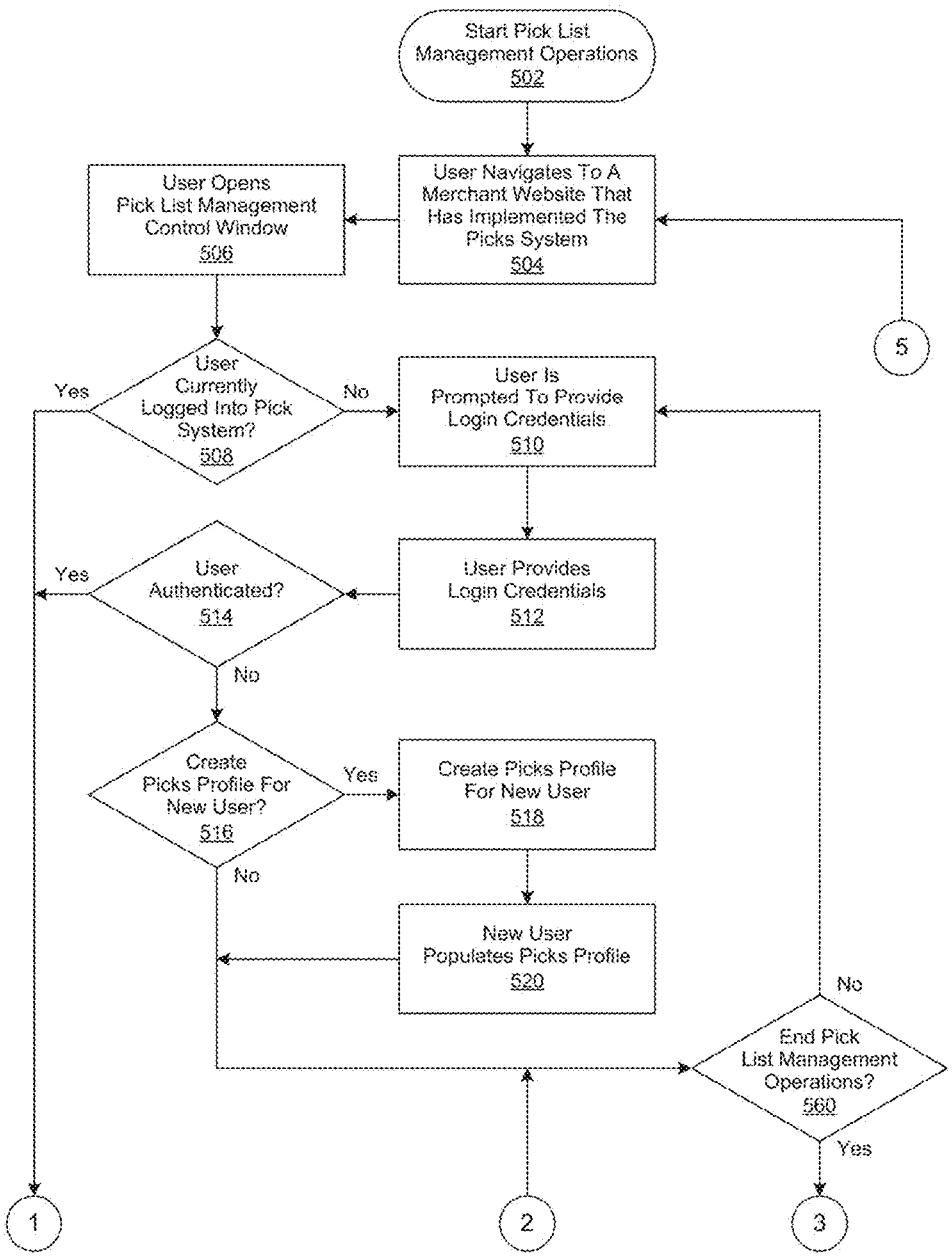
FIGS. 5a through 5c are a generalized flowchart of the performance of Pick List management operations in an electronic commerce environment.
Figure 5B:
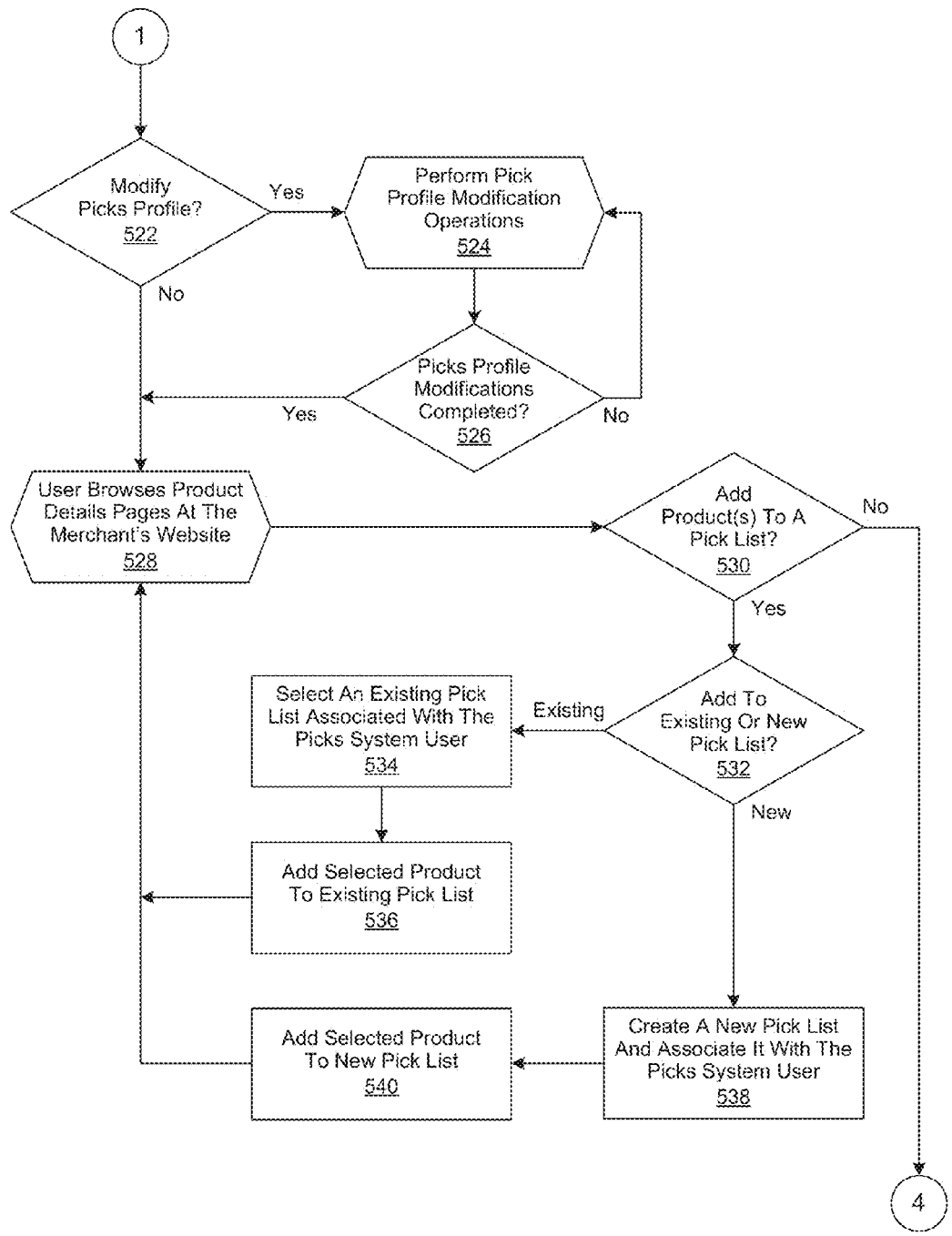
Figure 5C:
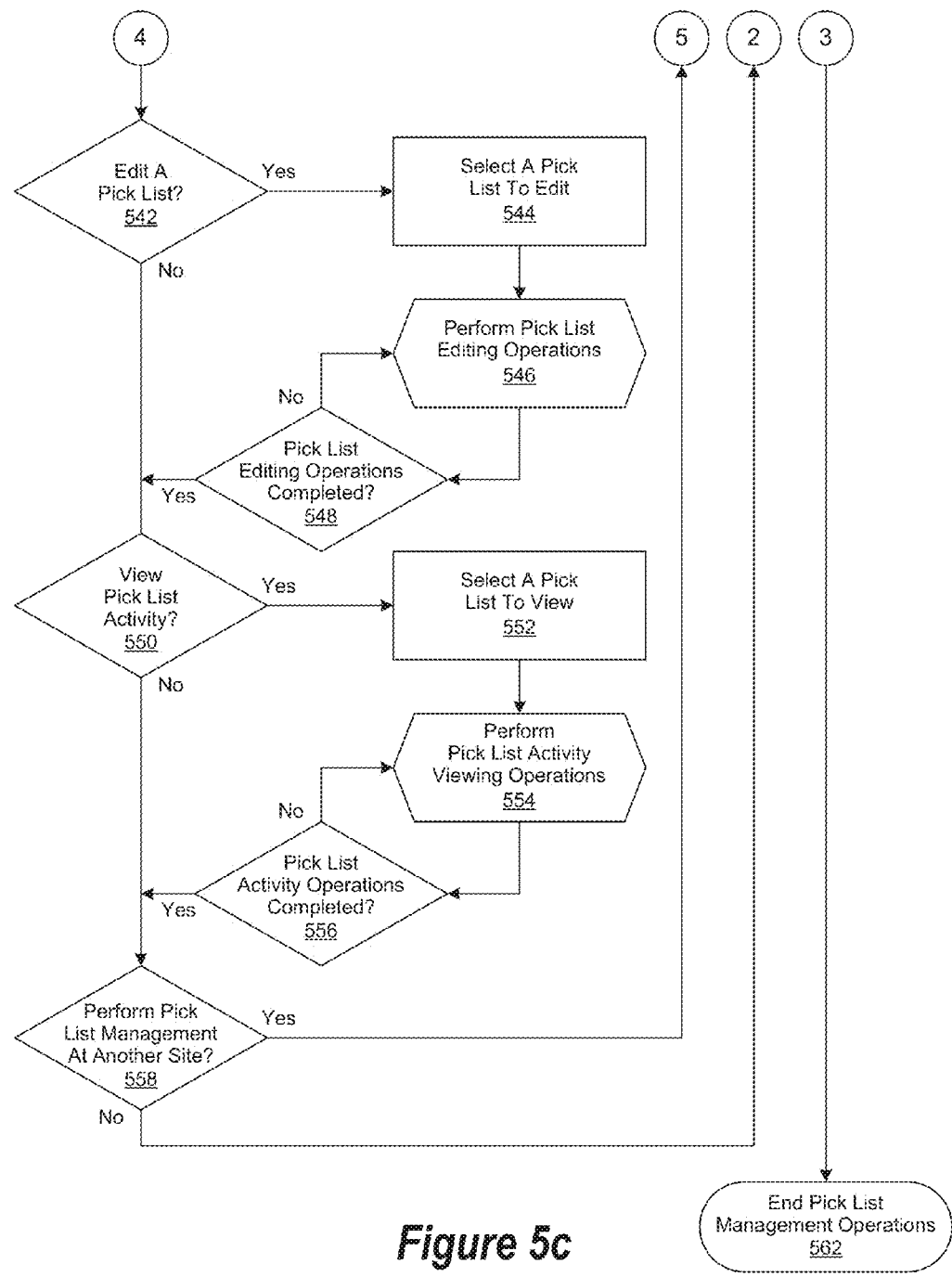

FIGS. 5a through 5c are a generalized flowchart of Pick List management operations performed in accordance with an embodiment of the invention in an electronic commerce environment. In this embodiment, Pick List management operations are begun in step 502, followed by a user navigating in step 504 to a merchant's web site that has implemented the Pick System. Then, in step 506, the user opens a Pick List management control window.

A determination is then made in step 508 whether the user is currently logged into the Pick System. In one embodiment, the user logs into the Pick System at each merchant's website. In another embodiment, Pick System is implemented to support universal login. In this embodiment, the user initially logs into the Pick System at a first merchant's website. Thereafter, they are automatically logged into the Pick System at other merchant's websites.

If it was determined in step 508 that the user not logged into the Pick System, then the user is prompted in step 510 to provide login credentials, which are then provided in step 512. A determination is then made in step 514 whether the user has been authenticated by the provided login credentials. If not, a determination is made in step 516 whether to create a Picks user profile for the user. If so, then a Picks user profile is created for the new user, who then populates the newly-created Picks user profile with associated user account information in step 520.

Once the new Pick System user populates their Picks user profile in step 520, or if it was determined in step 516 not to create a Picks user profile for a new user, a determination is made in step 560 whether to end Pick List management operations. If not, then the process is continued, proceeding with step 510. Otherwise, Pick List management operations are ended in step 562.

However, if it was determined in step 508 that the user was currently logged into the Pick System, or if it was determined in step 514 that the user was authenticated, then a determination is made in step 522 whether the user's Picks user profile is to be modified. If so, then Picks user profile modifications are performed in step 524. A determination is then made in step 526 whether modification operations to the user's Picks user profile have been completed. If not, then the process is continued, proceeding with step 524. Otherwise, or if it was determined in step 522 that the user's Picks user profile was not to be modified, then the user browses product details pages at the merchant's website in step 528.

A determination is then made in step 530 whether one or more products displayed on a product details page is to be added to a Pick List by the Pick System user. If so, then a determination is made in step 532 whether the one or more products is to be added to an existing or a new Pick List. If it is determined in step 532 that the one or more selected products is to be added to an existing Pick List associated with the Pick System user, then the existing Pick List is selected by the Pick System user in step 534. The one or more selected products are then added to the selected Pick List in step 536. However, if it is determined in step 532 to add the one or more selected products to a new Pick List, then a new Pick List is created and associated with the Pick System user in step 538. The one or more selected products are then added to the newly-created Pick List in step 540. Once the one or more selected products are respectively added to the existing or newly-created Pick Lists in steps 536 or 540, the process is continued, proceeding with step 528.

However, if it was determined in step 530 not to add one or more products to a Pick List, then a determination is made in step 542 whether to edit a Pick List. If so, then a Pick List is selected in step 544 to edit. Pick List editing operations are then performed on the selected Pick List in step 546. Once Pick List editing operations are performed in step 546, a determination is made in step 546 whether Pick List editing operations are completed. If not, then the process is continued, proceeding with step 543. Otherwise, or if it was determined in step 542 not to edit a Pick List, a determination is made in step 550 whether to view Pick List activity. If so, then a Pick List to view is selected in step 552, followed by the performance if Pick List activity viewing operations in step 554.

Once Pick List activity viewing operations have been performed in step 554, a determination is made in step 556 whether Picks List activity viewing operations have been completed. If not, then the process is continued, proceeding with step 554. Otherwise, or if it was determined in step 550 not to view Pick List activity, a determination is made in step 558 whether to continue Pick List management operations at another merchant's web site. If so, then the process is continued, proceeding with step 504. Otherwise, the process is continued, proceeding with step 560.

Figure 6A:
FIGS. 6a and 6b show the display of user's Picks user profile within a user interface (UI) window.
Figure 6B:
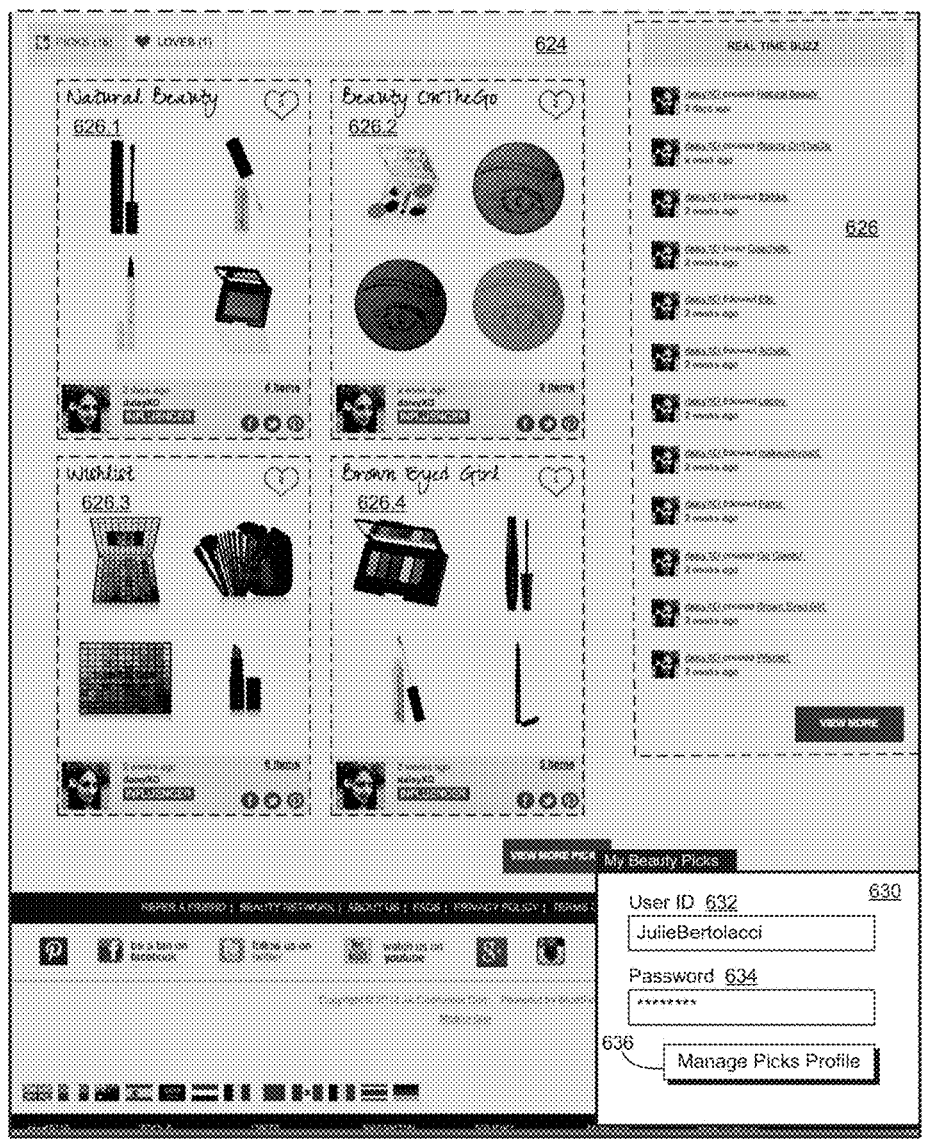

FIGS. 6*a* and 6*b* show the display of user's Picks user profile within a Picks user profile user interface (UI) window implemented in accordance with an embodiment of the invention. In various embodiments, a Pick System user navigates to a merchant's web site that has implemented the Pick System to manage their Picks user profile 604. As used herein, a Picks user profile 604 refers to the combination of Pick System user account information and associated Picks data. In various embodiments, the data in a Picks user profile 604 may include the Pick System user's login credentials 632, 634, their Pick System screen name 606 or Picks avatar 608, associated user information 610, Pick Lists 626.1, 626.2, 626.3, 626.4 and Pick Collages they have created, and their "likes" and "favorites" 612. As used herein, a "Pick System screen name" 606 refers to a user identifier associated with a user of the Pick System. In certain embodiments, the user is unable to create and manage their Pick Lists 626.1, 626.2, 626.3, 626.4 and Pick Collages until an associated Picks user profile 604 has been created.

If the user is not currently logged into the Pick System, then they submit their user credentials for authentication. In certain embodiments, a Picks fly-out UI window 630 is implemented for the submission of user credentials, such as a user identifier (ID) 632 and password 634. As used herein, a Picks fly-out UI window 630 refers to a fly-out window that resides on a merchant's web page, which can be opened and used by a Picks system user for various purposes. In various embodiments, these purposes include being authenticated by the Pick System and managing their associated Pick Lists, Pick Collages, or Picks user profile. In certain of these embodiments, the Picks fly-out UI window 630 is persistently made available to the user as they navigate various pages of the merchant's website. In various embodiments, the Pick System provides standalone user account management and authentication capabilities. In certain embodiments, Pick System user account management and authentication capabilities are integrated into the merchant's website's existing user account and authentication services.

In certain embodiments, the Pick System user can either log into an existing Picks account or create a new one. If the user decides to create a new Picks account, then an associated Picks user profile 604 is created, populated by the user, and then displayed within the Picks user profile UI window 602. Once the Pick System user is authenticated, they can then proceed to manage their Picks user profile by selecting a command button, such as the "Manage Picks user profile" command button 636, with a user gesture.

In various embodiments, the Picks user profile 604 provides the ability for the user to create a "persona" that may include items such as a Pick System screen name 606, a profile picture 608 or Picks avatar 608, a geographic location 610, interests 612, and a profile description 610. In certain embodiments, the Pick System user can edit this information by selecting an "Edit" command button 640 through a user gesture, such as a mouse-click with a cursor. In various embodiments, the provided "persona" information becomes the basis of the user's public Picks user profile 604 on the merchant's website.

In various embodiments, Pick Lists 626.1, 626.2, 626.3, 626.4 and Pick Collages are displayed within a Pick Lists sub-window 624. In these embodiments, the Pick Lists 626.1, 626.2, 626.3, 626.4 include a reference to the Pick System user that created them. In certain of these embodiments, a Pick List 626.1, 626.2, 626.3, 626.4 or Pick Collage can be "clicked-through" by viewers who desire additional information associated with their creator. In these embodiments, the creator's Picks user profile 604 is then displayed in the Picks user profile UI window 602. In various embodiments, the Picks user profile 604 contains personalized attributes about the Pick System user to further support the authenticity of the content they have created.

In various embodiments, a Pick System user is provided the ability to upload a Picks user profile image 808 that will be displayed with their Pick Lists 626.1, 626.2, 626.3, 626.4, Pick Collages and Picks user profile 604. In certain embodiments, a Pick System user is provided the ability to import an existing social media (e.g., Facebook®, Twitter®, etc.) profile image as their Picks user profile image 608. In various embodiments, a Pick System user is provided the ability to define a Picks user profile Screen Name 606 that is displayed with their Pick Lists 626.1, 626.2, 626.3, 626.4, Pick Collages, and Picks user profile 604. In certain embodiments, a Pick System user is provided the ability to select predetermined attributes 610, 612 that express their interests, define their location information, and write a brief description about themselves. In various embodiments, a Pick System user is provided the ability to select a predetermined image for their Picks user profile from a list of predefined backgrounds.

In various embodiments, the Pick System is implemented to provide Pick System users the ability to socially share their Picks user profile 604, or another user's Picks user profile to various social media environments 620, such as Facebook®, Twitter® or Pinterest®. For example, the other such users may be "followers" 616 of the Pick System user or users that the Pick System user is "following" 618. In certain embodiments, viewers of another user's Picks user profile have the ability to "follow" that user through the selection of a "Follow" control button 614 through a user gesture, such as a mouse-click. In various embodiments, each Pick System user's Picks user profile 604 displays who the "followers" 616 are of a Pick System user. In certain embodiments, the user's Picks user profile 604 displays who the Pick System user is "following" 618. In certain embodiments, the Pick System is implemented to allow a Pick System user to "click through" a listed follower 616 to access that the follower's associated Pick Lists, Pick Collages, and Picks user profile.

In various embodiments, the Pick System is implemented to provide an ongoing update of Pick List activities, herein referred to as a "Picks Activity Feed" 628, related to the Pick System user. In certain embodiments, the Picks Activity Feed 628 is provided in the form of a "Public View" within the Picks user profile UI window 602. In these embodiments, only predetermined Picks Activity Feed 628 information associated with a Pick System user is displayed to viewers of the user's Picks user profile 604. In one embodiment, the predetermined Picks Activity Feed 628 information only includes Pick List activities that the Pick System user has completed. In various embodiments, the Public View of the Picks Activity Feed 628 provides a list of the Pick Lists that the Pick System user has created. In certain embodiments, the Public View of the Picks Activity Feed 628 provides a list of the Pick Lists that the Pick System user has "liked." In certain embodiments, the Picks Activity Feed 628 is provided in the form of a "Private View." In these embodiments, the Picks Activity Feed information includes activities completed by the user as well as activities associated with other users' Pick Lists, Pick Collages, and Picks user profiles.

Figure 7A:
FIGS. 7a and 7b show a Pick List fly-out user interface window implemented to manage a plurality of Pick Lists.
Figure 7B:
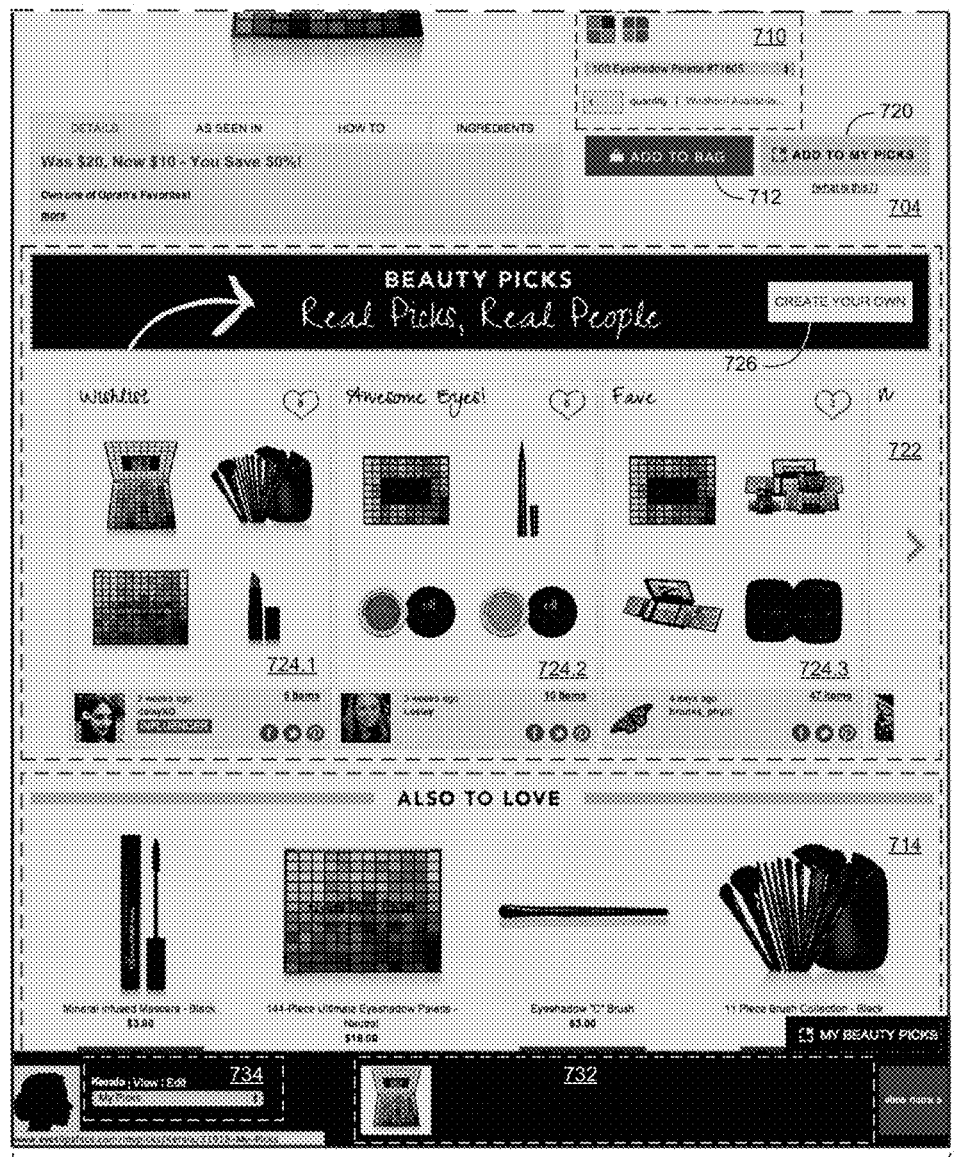

FIGS. 7a and 7b show a Pick List fly-out user interface window implemented in accordance with an embodiment of the invention to manage a plurality of Pick Lists. In various embodiments, Pick System functionality is implemented in a merchant's website. In certain of these embodiments, predetermined Pick System functionality is exposed to the user within a user interface (UI) window, such as a product details UI window 702 of the merchant's website. In this embodiment, the product details UI window 702 includes a featured product sub-window 704, which includes details associated with an individual featured product (e.g., product description, pricing, etc.), and a suggested products sub-window 714, which includes summary descriptions of a plurality of suggested products.

Referring to FIG. 7a, the featured product sub-window 704 also includes a "Write a Review" command button 706, which allows a Picks User to post a review of the featured product when selected through a user gesture, such as a mouse-click with a cursor. In certain embodiments, the featured product sub-window 704 includes a plurality of "Share with Friends" command buttons 708. In these embodiments, a Pick System user is provided the ability to socially share the featured product to a predetermined social media site (e.g., Facebook®, Twitter®, etc.) by selecting a corresponding "Share with Friends" command button 708 with a user gesture. In various embodiments, the featured product sub-window 704 includes a modal shopping sub-window 710, described in greater detail herein, which displays different options (e.g., quantity, colors, sizes, styles, etc.) that are available for the featured product.

In certain embodiments, the featured product sub-window 704 includes an "Add to Bag" command button 712. In these embodiments, the featured product is added to the user's shopping cart by selecting the "Add to Bag" command button 712 through a user gesture. In various embodiments, an "Add to My Picks" 720 control button is displayed to the Pick System user within the product details UI window 704. In certain embodiments, selection of the "Add to My Picks" 720 control button presents the Pick System user additional user controls, which allow the user to specify which Pick List the product should be added to. In various embodiments, a plurality of Pick Lists 724.1, 724.2, 724.3 associated with various Pick List users are displayed within a Pick Lists sub-window 722. In these embodiments, a Pick System user is able to create a new Pick List by selecting a "Create Your Own" command button 726.

In various embodiments, a Picks fly-out UI window 730 is implemented to provide the Pick System user the ability to perform Pick List editing operations on a predetermined Pick List. In certain embodiments, the Picks fly-out UI window 730 is implemented to display thumbnail images 732 of their existing Pick Lists. In these embodiments, a target thumbnail image 732 is selected by the Pick System user, who then uses controls 734 to view or edit the Pick List corresponding to the selected thumbnail image 732.

In certain embodiments, the Picks fly-out UI window 730 is implemented to provide the Pick System user the ability to delete individual products from the Pick List, rearrange the display order of products, rename, or delete the Pick List from the Pick System. In various embodiments, the Picks system automatically creates a Picks Detail Page that provides a list of products contained in the Pick List. In certain embodiments, the Pick System provides access to additional information and capabilities depending upon the context of the Pick System user viewing the Picks Detail Page. In various embodiments, the Picks fly-out UI window 730 is implemented to provide the Pick System user the ability to directly access the Picks Detail Page.

Figure 8A:
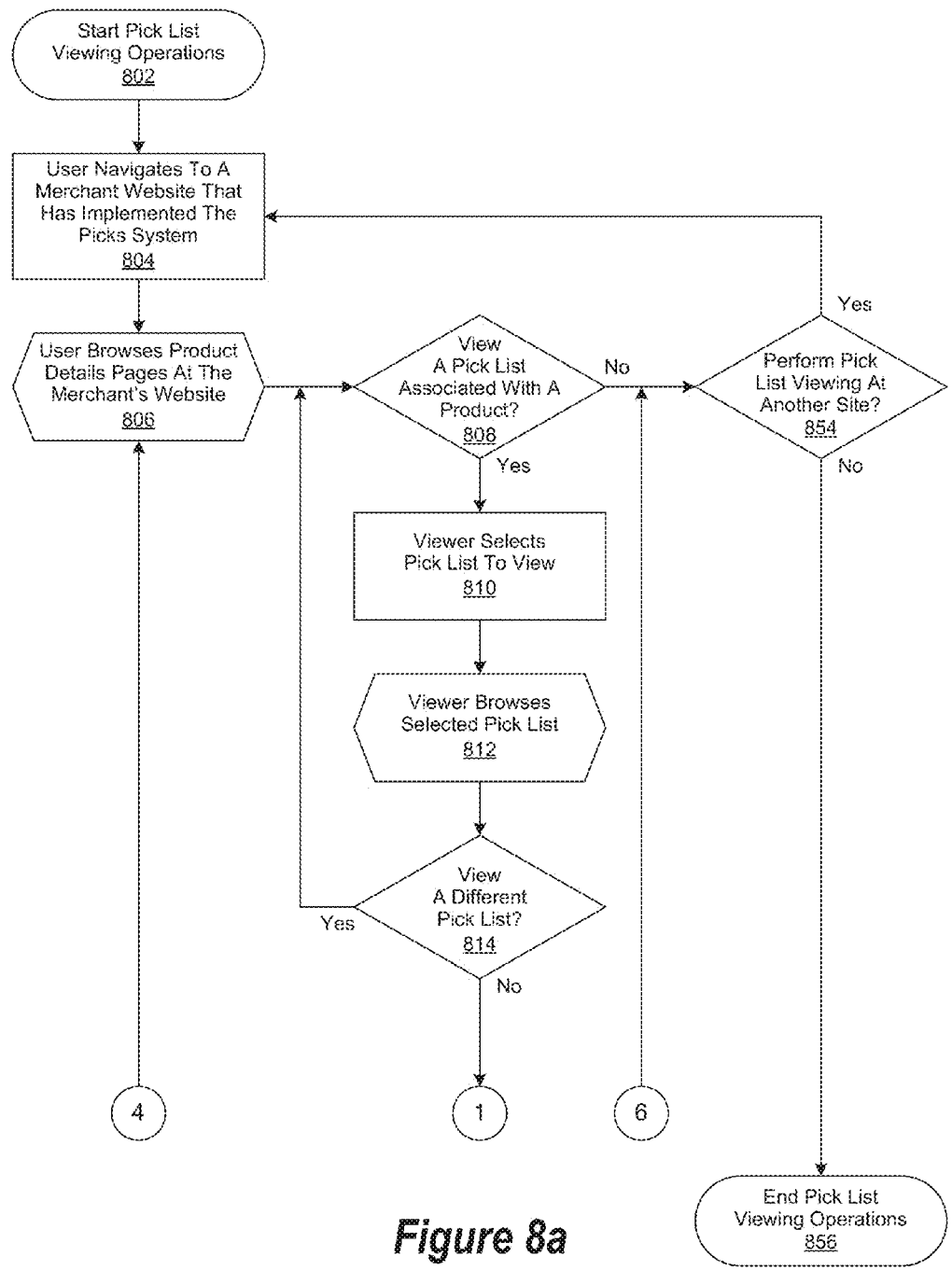
FIGS. 8a through 8c are a generalized flowchart of the performance of Pick List viewing operations in an electronic commerce environment.
Figure 8B:
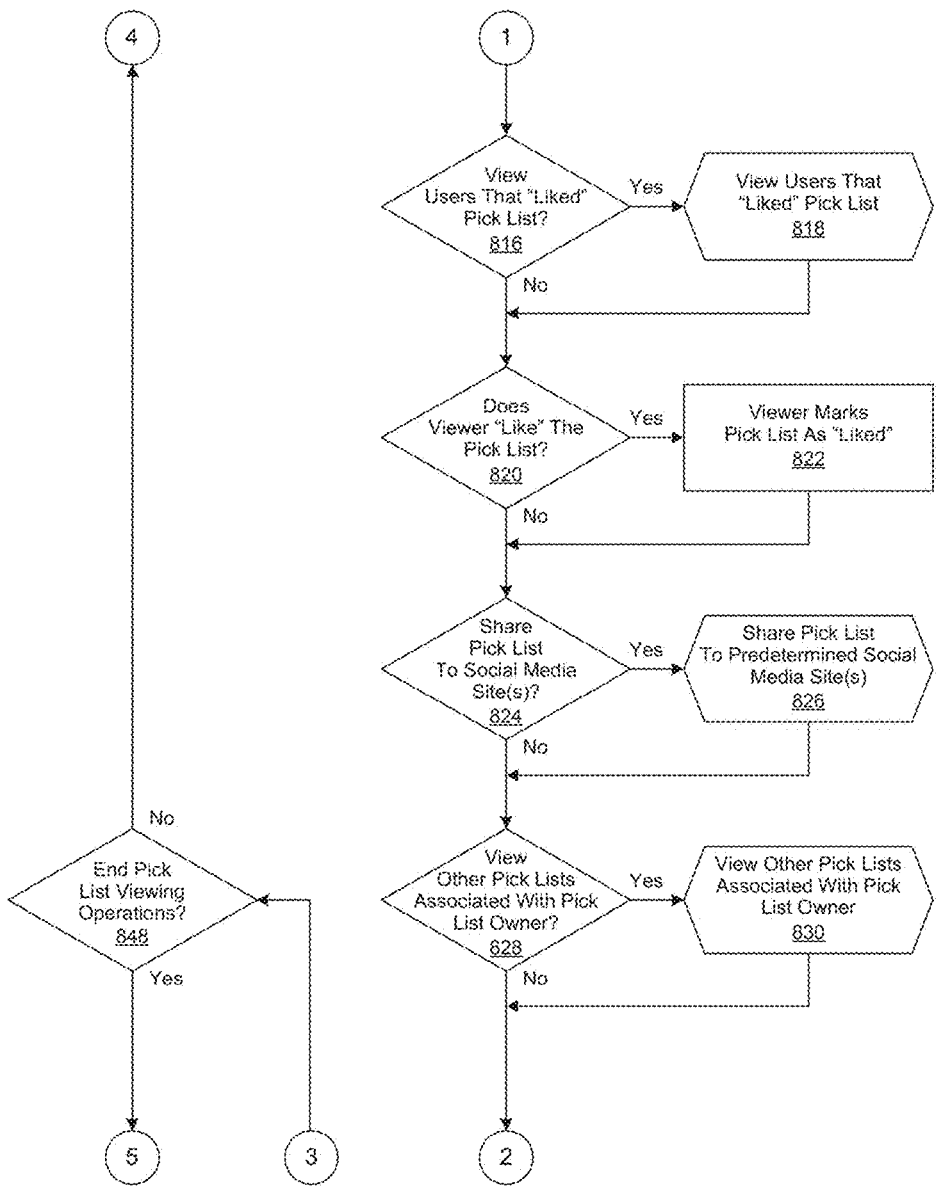
Figure 8C:
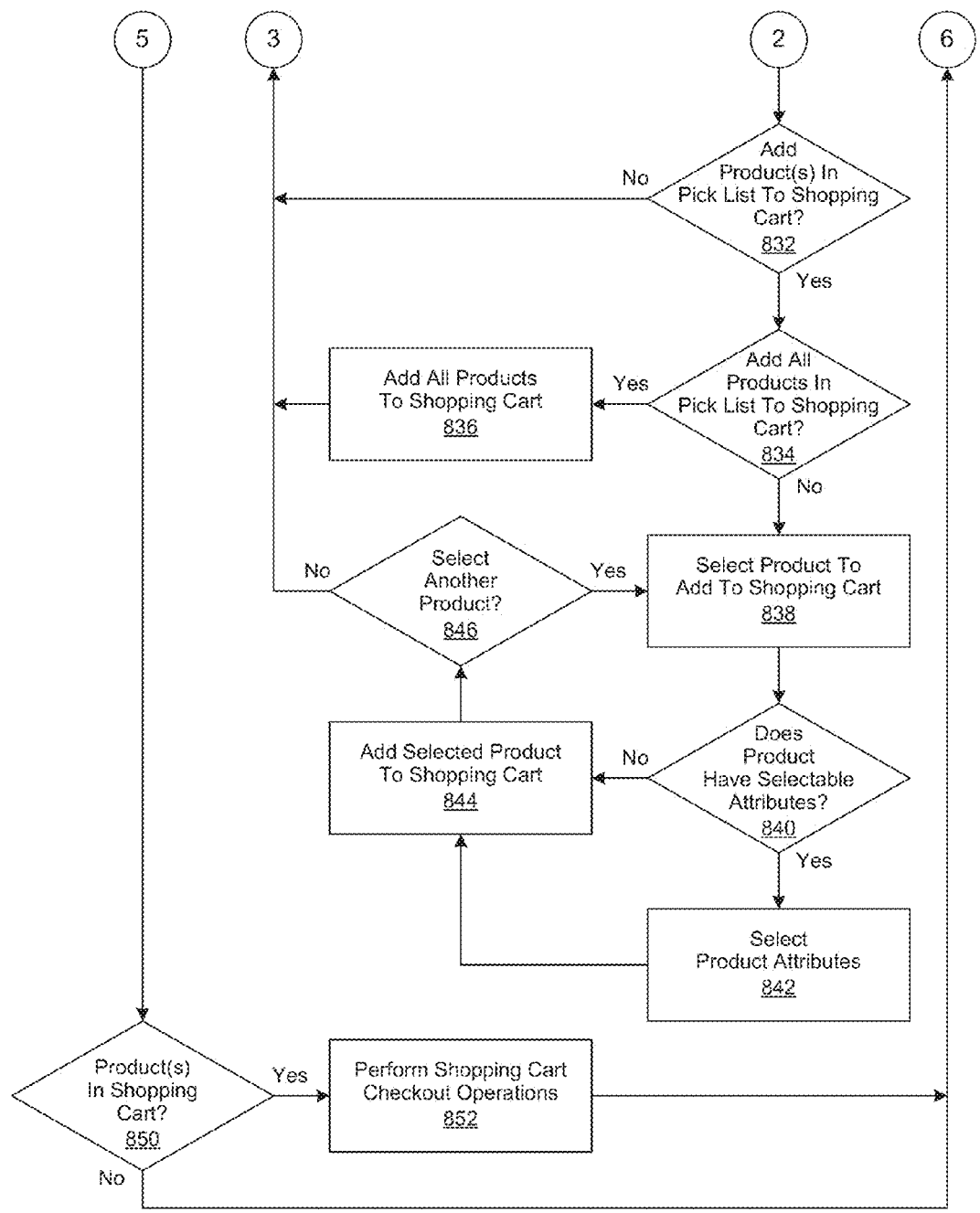

FIGS. 8a through 8c are a generalized flowchart of Pick List viewing operations performed in accordance with an embodiment of the invention in an electronic commerce environment. In this embodiment, Pick List viewing operations are begun in step 802, followed by a user navigating in step 804 to a merchant's web site that has implemented the Pick System. The user then browses product details pages at the merchant's website in step 806, followed by a determination being made in step 808 whether to view a Pick List associated with a product in step 808. If not, then a determination is made in step 854 whether to perform Pick List viewing operations at another merchant's website. If so, then the process is continued, proceeding with step 804. Otherwise, Pick List viewing operations are ended in step 856.

However, if it was determined in step 806 to view a Pick List associated with a product displayed on merchant's product details page, then the viewer selects a Pick List to view in step 810. The selected Pick list is then browsed by the viewer in step 812. In various embodiments, viewing the Pick List provides the viewer a list of the products within the Pick List, including their associated product name, product title, product ratings, and price. In certain embodiments, selecting product listed in the Pick List with a user gesture, such as a mouse click, allows the viewer to add the selected product to their shopping cart as described in greater detail herein.

A determination is then made in step 814 whether to view a different Pick List. If so, then the process is continued, proceeding with step 808. Otherwise, a determination is made in step 816 whether the viewer wishes to view other users who "liked" the selected Pick List. If so, then a list of other users who "liked" the selected Pick list is displayed to the viewer in step 818. In certain embodiments, the Pick System is implemented to allow the viewer to "click through" a listed viewer to access that the viewer's associated Pick Lists, Pick Collages, and Picks user profile. After the viewer has completed viewing the viewers that "liked" the Pick List, or if it was determined in step 816 not to view users that "liked" the Pick List, a determination is made in step 820 whether the viewer wishes to "like" the Pick List. If so, then the viewer performs a user gesture in step 822 to mark the Pick List as a Pick List they "liked."

After the viewer has marked the Pick List in step 822 as a Pick List they "liked," or if it was determined in step 820 not to mark the selected Pick List as a Pick List they "liked," a determination is made in step 824 whether the viewer wishes to "share" the Pick List to a social media site. If so, then the viewer performs social media "sharing" operations familiar to those of skill in the art in step 826 to "share" the Pick List to one or more social media sites (e.g., Facebook®, Twitter® or Pinterest®, etc.). In certain embodiments, social media control buttons are implemented to facilitate the viewer in "sharing" the Pick List to one or more social media sites. In various embodiments, a Picks Detail Page, described in greater detail herein, is displayed to the viewer. In these embodiments, the viewer performs social media "sharing" operations familiar to those of skill in the art in step 826 to socially share the Picks Detail Page to one or more social media sites. In certain embodiments, social media control buttons are implemented to facilitate the viewer in "sharing" the Pick Details Page to one or more social media sites.

After the viewer has performed Pick List social media "sharing" operations in step 826, or if it was determined in step 824 not to "share" the selected Pick List to one or more social media sites, a determination is made in step 828 whether the viewer wishes to view other Pick Lists associated with the creator of the currently selected Pick List. If so, then the viewer views other Pick Lists associated with creator of the currently selected Pick List in step 830. After the viewer has viewed other Pick Lists associated with the creator of the currently selected Pick List step 830, or if it was determined in step 828 not to view other Pick Lists associated with the creator of the currently selected Pick List, a determination is made in step 832 whether the viewer wishes to add one or more products in the selected Pick List to their shopping cart.

If it was determined in step 832 that the viewer did not wish to add one or more products in the Pick List to their shopping cart, then a determination is made in step 848 whether to end Pick List viewing operations. If not, then the process is continued, proceeding with step 806. However, if it was determined in step 832 to add one or more products in the selected Pick List, then a determination is made in step 834 whether the viewer wishes to add all of the products in the selected Pick List to their shopping cart. If so, then they are added in step 836. However, if it was determined in step 834 that the viewer does not wish to add all of the products in the selected Pick List to their shopping cart, then a product in the Pick List is selected in step 838, followed by a determination being made in step 840 whether the selected product has any selectable attributes. If so, then the viewer selects the desired product attributes in step 842 and the selected product is added to the shopping cart in step 844, followed by a determination being made in step 846 whether the viewer wishes to select another product. If so, the process is continued, proceeding with step 838.

Otherwise, or once all products in the selected Pick List are added to the viewer's shopping cart in step 836, or if it was determined in step 832 not to add one or more products to the viewer's shopping cart, then the process is continued, proceeding with step 848. However, if it is determined in step 848 to end Pick List viewing operations, then a determination is then made in step 850 whether there are products in the viewer's shopping cart. If so, then shopping cart checkout operations familiar to those of skill in the art are performed in step 852. Thereafter, or if it was determined in step 850 that there are no products in the viewer's shopping cart, then the process is continued, proceeding with step 854.

Figure 9A:
FIGS. 9a and 9b show the display of individual products associated with a Pick List within a UI window.
Figure 9B:
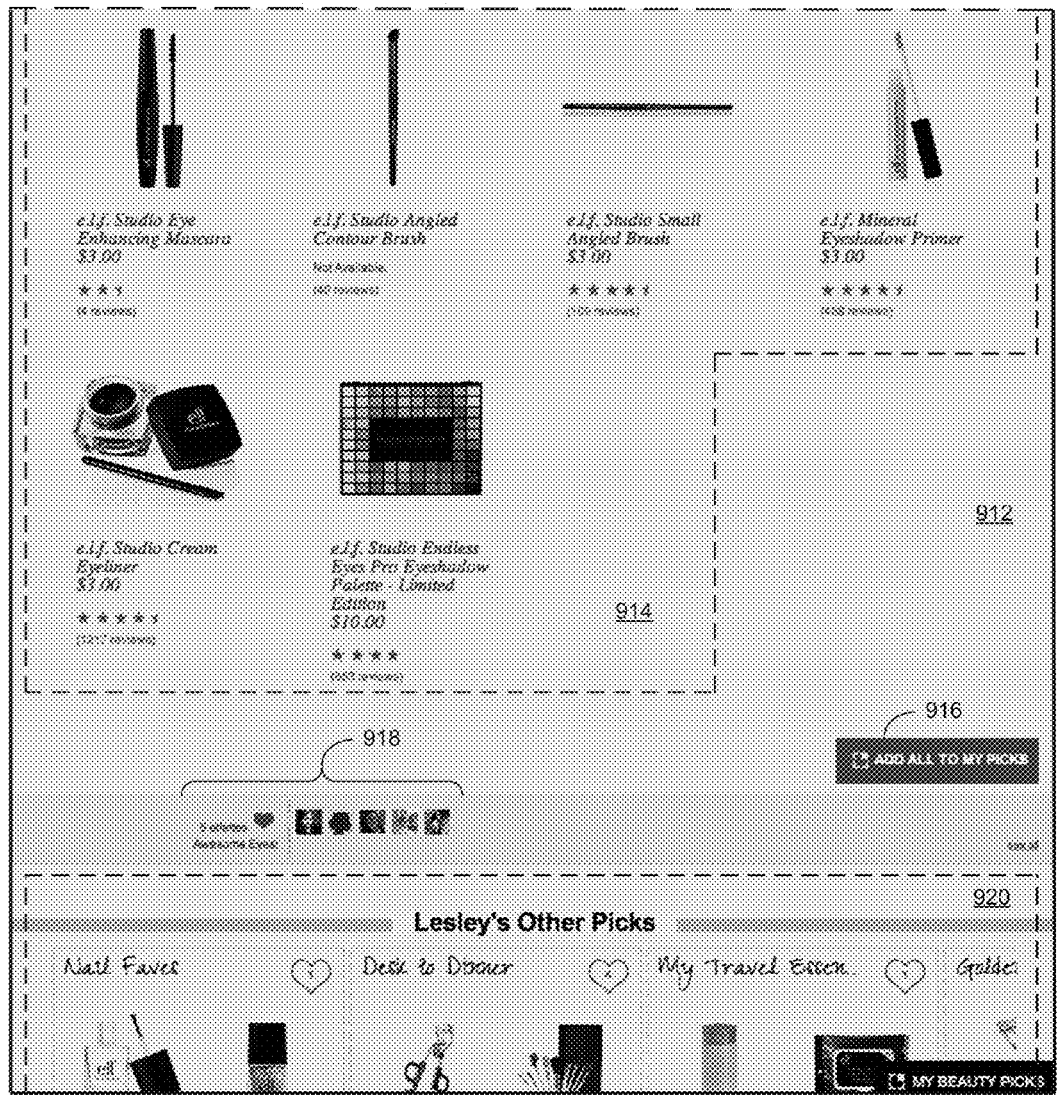

FIGS. 9*a* and 9*b* show the display individual products associated with a Pick List within a user interface (UI) window implemented in accordance with an embodiment of the invention. In various embodiments, individual products 914 associated with a Pick List are displayed within a Pick List content UI window 912. In various embodiments, the Picks user profile 904 of the creator of the Pick list is displayed in conjunction with the Pick List content UI window 912. In certain embodiments, the Picks user profile 904 may display the Pick List creator's Pick System screen name 906, their Picks avatar 908, and the number of their "followers" 910 on social media sites. In various embodiments, thumbnail images 918 of the followers are displayed. In one embodiment, the viewer of the Pick List content UI window 912 can add all of the individual products 914 to their own Pick List by selecting the "Add All to My Picks" command button 916 with a user gesture, such as a mouse-click with a cursor. In various embodiments, other Pick Lists 920 created by the creator of the Pick List shown in the Pick List content UI window 912 are displayed. In certain embodiments, the viewer of the other Pick Lists 920 can "click-through" to the other Pick Lists 920 with a user gesture, such as a mouse-click with a cursor.

Figure 10A:
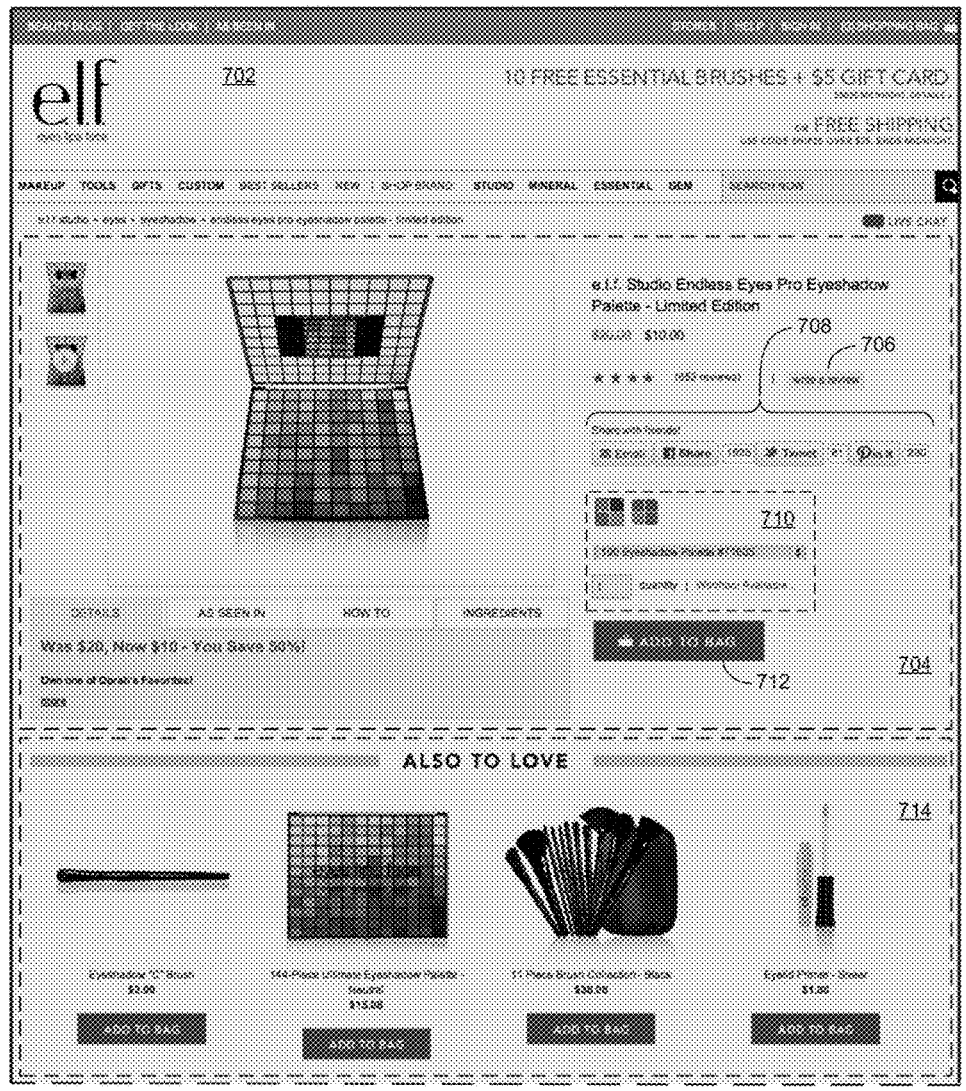
FIGS. 10a and 10b show the display of product details and associated user reviews and recommendations within a UI window.
Figure 10B:
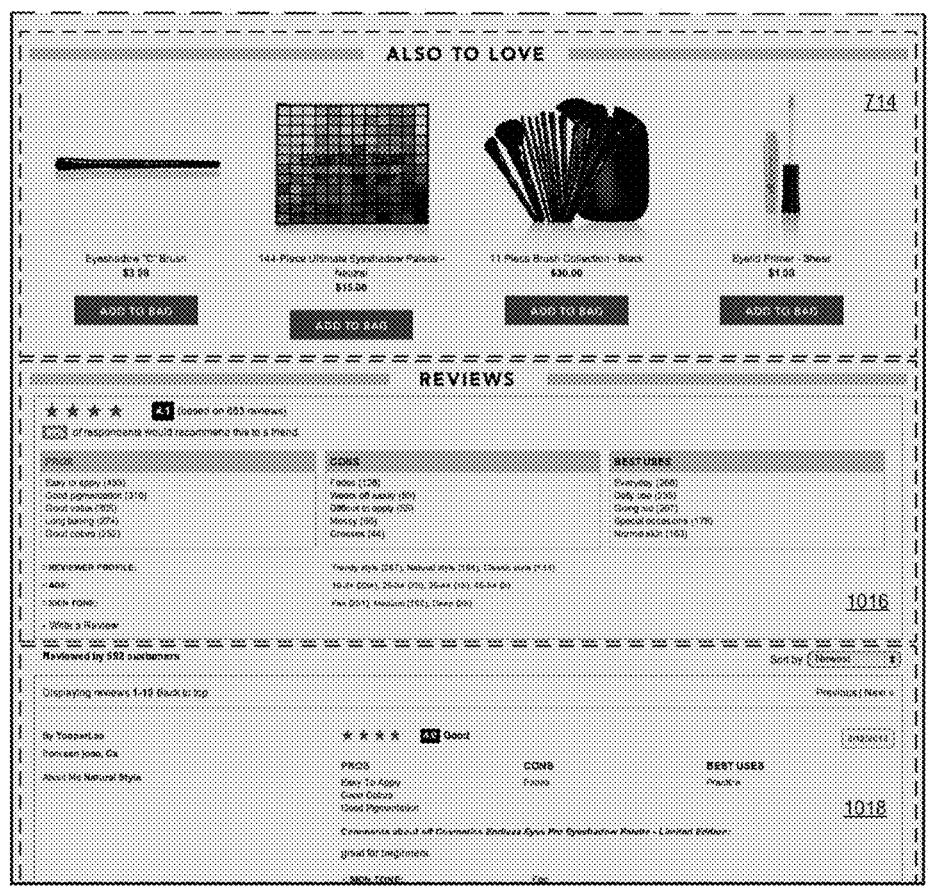

FIGS. 10*a* and 10*b* show the display of product details and associated user reviews and recommendations within a user interface (UI) window implemented in accordance with an embodiment of the invention. In various embodiments, Pick System functionality is implemented in a merchant's website. In certain of these embodiments, predetermined Pick System functionality is exposed to the user within a UI window, such as a product details UI window 702 of the merchant's website. In this embodiment, the product details UI window 702 includes a featured product sub-window 704, which includes details associated with an individual featured product (e.g., product description, pricing, etc.), and a suggested products sub-window 714, which includes summary descriptions of a plurality of suggested products. As shown in FIG. 10*b*, the product details UI window 702 also includes a summarized product review sub-window 1016, which includes summary information associated with users' reviews of the product displayed in the featured product sub-window 704. Likewise, the product details UI window 702 includes an individual product review sub-window 1018, which includes a plurality of individual users' reviews of the product displayed in the featured product sub-window 704.

Referring to FIG. 10a, the featured product sub-window 704 also includes a "Write a Review" command button 706, which allows a Picks User to post a review of the featured product when selected through a user gesture, such as a mouse-click with a cursor. In various embodiments, the resulting product review is displayed within the individual product review sub-window 1018. In certain embodiments, the featured product sub-window 704 includes a plurality of "Share with Friends" command buttons 708. In these embodiments, a Pick System user is provided the ability to socially share the featured product to a predetermined social media site (e.g., Facebook®, Twitter®, etc.) by selecting a corresponding "Share with Friends" command button 708 with a user gesture. In various embodiments, the featured product sub-window 704 includes a modal shopping sub-window 710, described in greater detail herein, which displays different options (e.g., quantity, colors, sizes, styles, etc.) that are available for the featured product. In certain embodiments, the featured product sub-window 704 includes an "Add to Bag" command button 712. In these embodiments, the featured product is added to the user's shopping cart by selecting the "Add to Bag" command button 712 through a user gesture.

Figure 11A:
FIGS. 11a and 11b show a modal shopping sub-window implemented within a UI window.
Figure 11B:
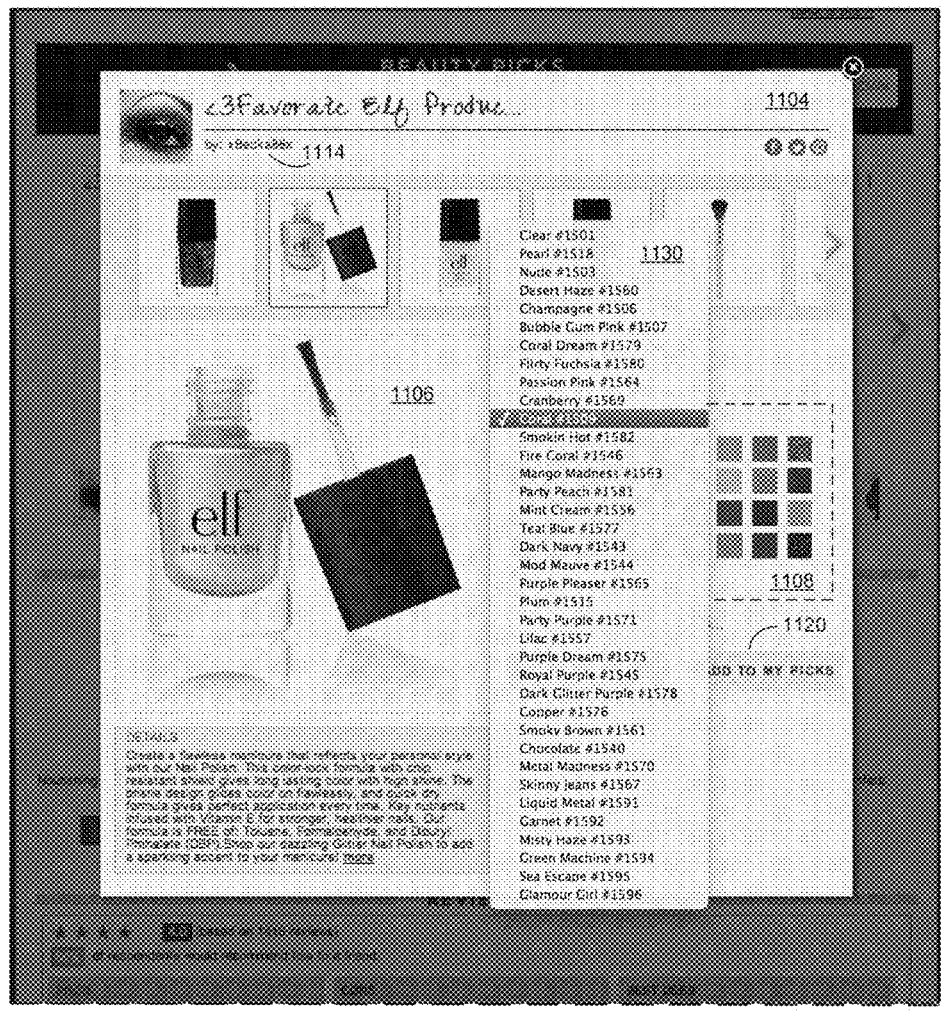

FIGS. 11a and 11b show a modal shopping sub-window implemented within a user interface (UI) window in accordance with an embodiment of the invention. In various embodiments, a modal shopping sub-window 1104 is implemented to allow a viewer of a Pick List to select a product 1106 listed within the Pick List with a user gesture, such as a mouse-click on the "Add to Bag" command button 1112, to add it to their shopping cart. In certain embodiments, the modal shopping sub-window is implemented to allow the viewer of the Pick List to select product variations 1108 (e.g., color, size, etc.) and quantity 1110 before adding their selection to their shopping cart. In various embodiments, the Pick System screen name 1114 of the creator of the Pick List is displayed within the modal shopping sub-window 1104. In certain embodiments, the viewer can "click-through" the Pick System screen name 1114, which hyperlinks the viewer to the Pick List creator's Picks user profile. In various embodiments, a product list drop-down menu 1130 is implemented within the modal shopping sub-window 1104, which lists product options for the selected product 1106.

Figure 12A:
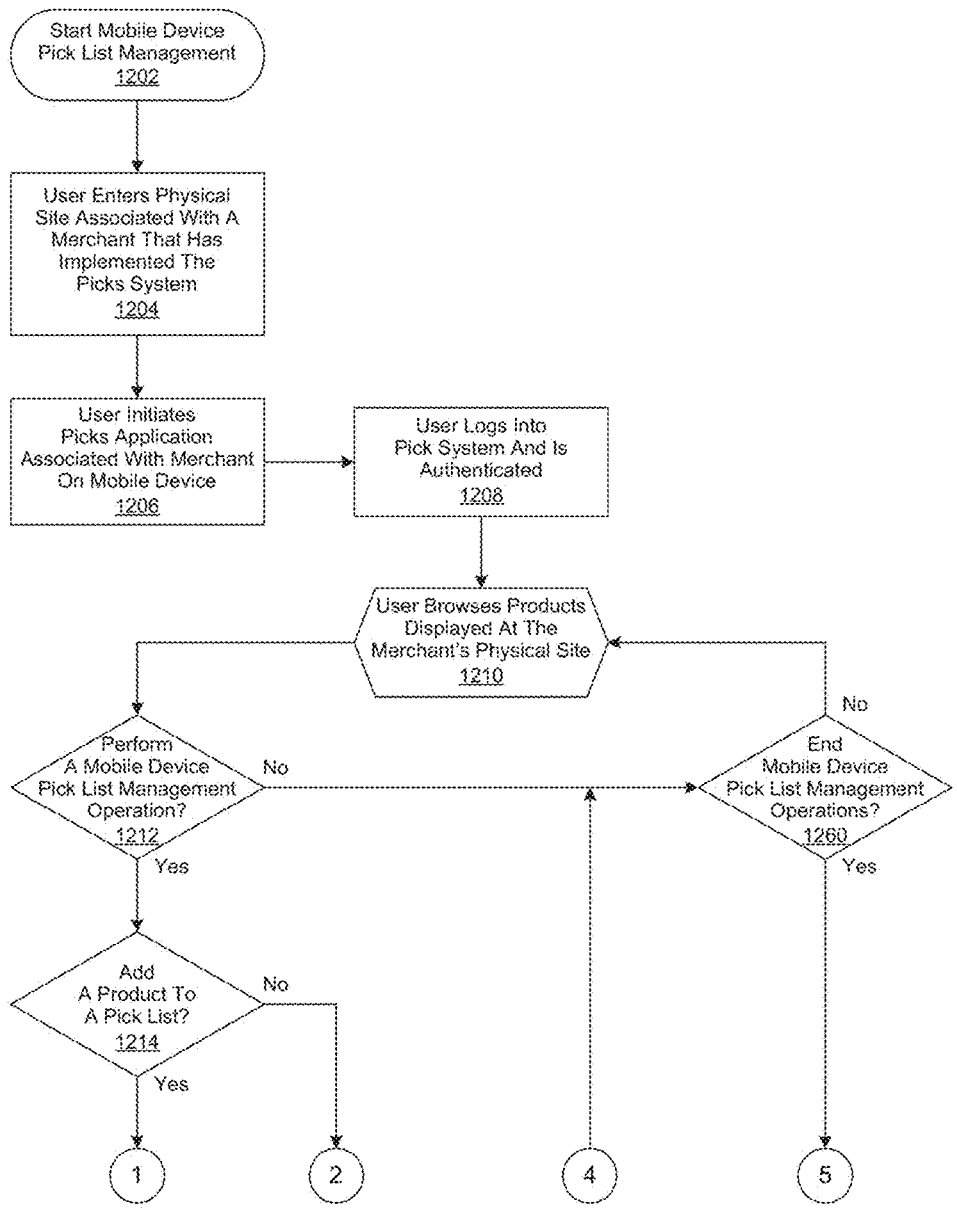
FIGS. 12a through 12c are a generalized flowchart of the performance of mobile device Pick List management operations.
Figure 12B:
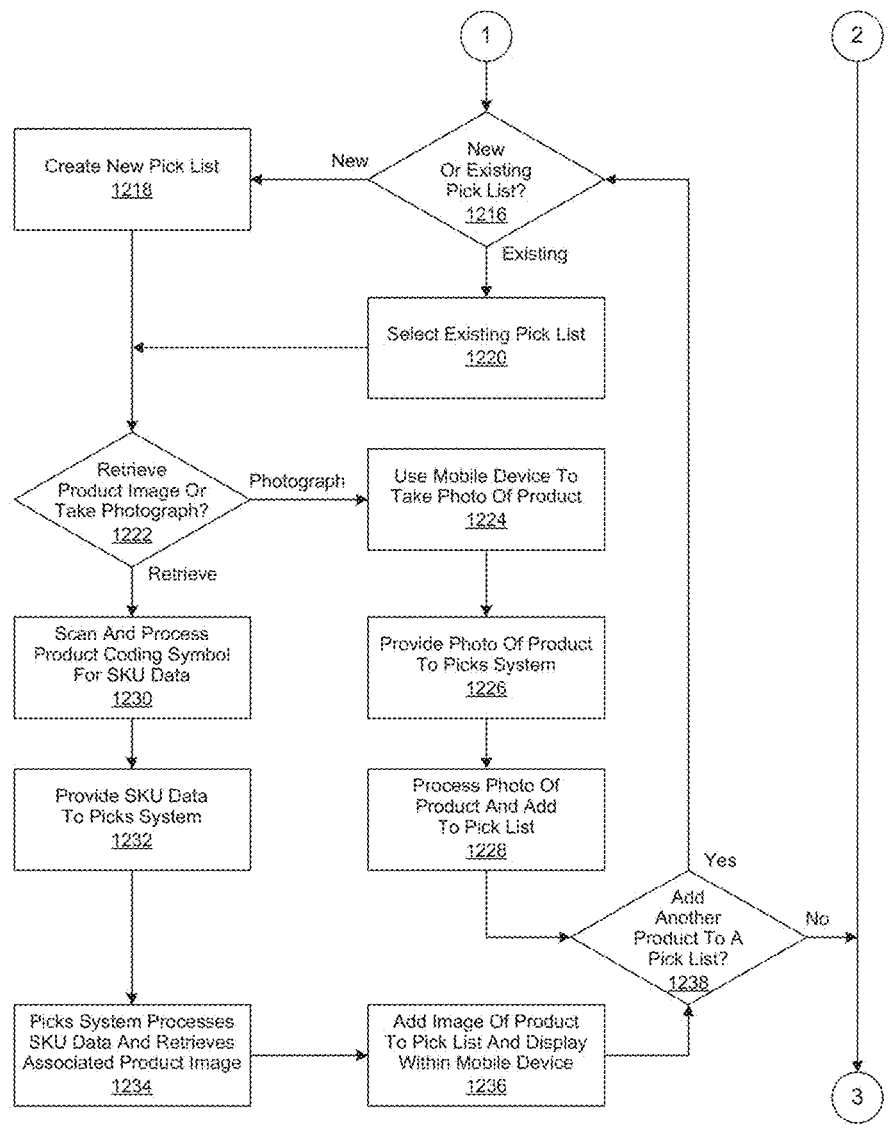
Figure 12C:
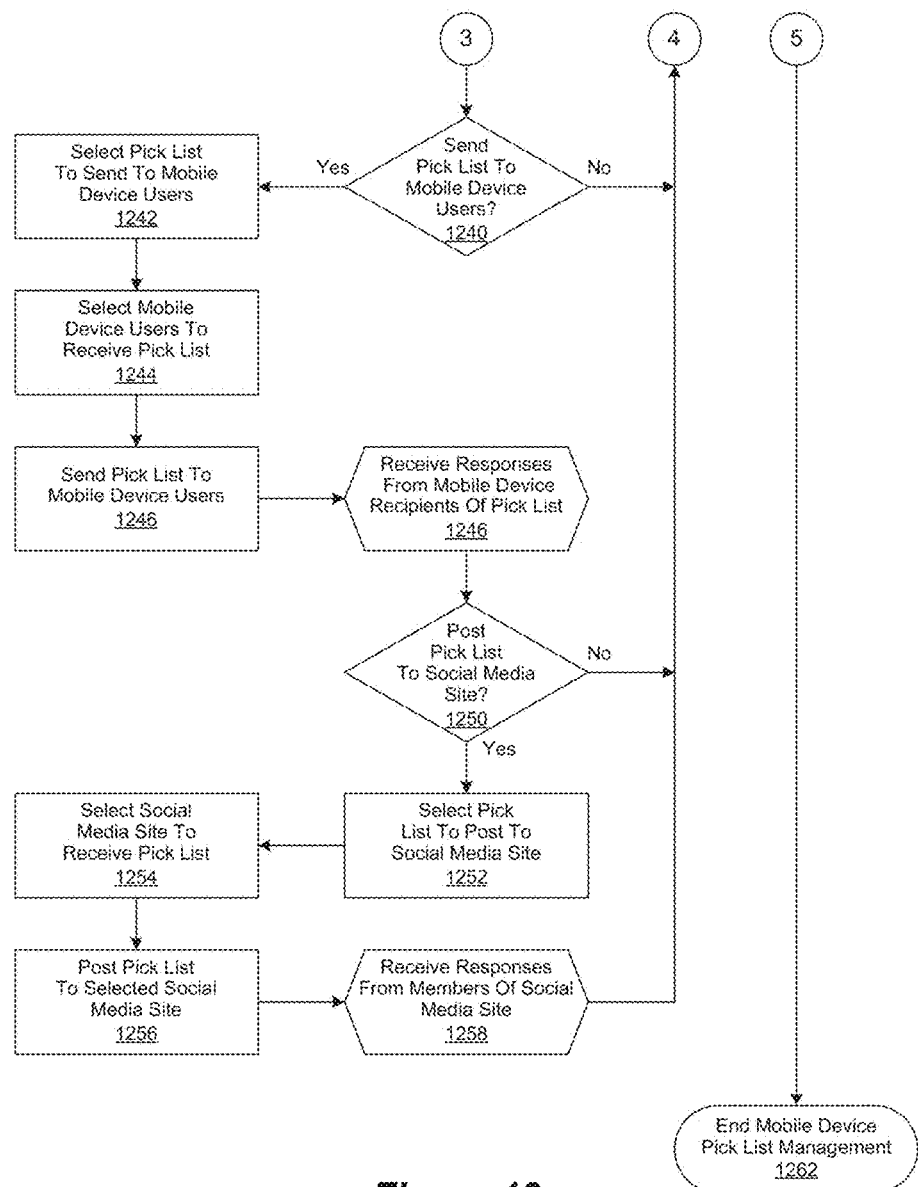

FIGS. 12a through 12c are a generalized flowchart of the performance of mobile device Pick List management operations implemented in accordance with an embodiment of the invention. In this embodiment, mobile device Pick List management operations are begun in step 1202, followed by a Pick System user entering a physical site associated with a merchant that has implemented the Pick System in step 1204. As an example, the physical site may be a retail or wholesale store. In step 1206, the Pick System user initiates a mobile Pick System application on their mobile device. In one embodiment, the mobile Pick System application is specific to a predetermined merchant that has implemented the Pick System, such as the merchant associated with the physical site. In another embodiment, the mobile Pick System application is configured to be specific to a predetermined set of merchants that have implemented the Pick System. In yet another embodiment, the mobile Pick System application is configured to support Pick System operations with any merchant that has implemented the Pick System.

The Pick System user then logs into the Pick System and is authenticated in step 1208. Once authenticated, the Pick System user browses products displayed at the merchant's physical site in step 1210, followed by a determination being made in step 1212 whether the Pick System user wishes to perform a mobile device Pick List management operation. If not, then a determination is made in step 1260 whether to continue mobile device Pick List management operations. If so, then the process is continued, proceeding with step 1210. Otherwise, mobile device Pick List management operations are ended in step 1262.

However, if it is determined in step 1212 to perform a mobile device Pick List management operation, then a determination is made in step 1214 whether to add a displayed product to a Pick List associated with the Pick List user. If so, then a determination is made in step 1216 whether to add the displayed product to a new Pick List or an existing Pick List. If it is determined in step 1216 to create a new Pick List, then a new Pick List is created by the Pick System user as described in greater detail herein. Otherwise, as likewise described in greater detail herein, an existing Pick List is selected by the Pick System user in step 1220.

Once a new Pick List has been created in step 1218, or an existing Pick List has been selected in step 1220, a determination is made in step 1222 whether to retrieve an existing image of the displayed product or take a photo of it. If it is determined in step 1222 to take a photo of the displayed product, then the Pick System user uses a camera integrated within their mobile device in step 1224 to take a photo of the displayed product. The photo of the displayed product is then provided to the Pick System in step 1226, where it is processed and added to the newly-created or selected Pick List in Step 1228.

However, if a determination was made in step 1222 to retrieve an image of the displayed product, then a coding symbol associated with the displayed product is scanned and processed in step 1230 to generate stock keeping unit (SKU) data. In various embodiments, the coding symbol may be implemented as a quick response (QR) code. In certain embodiment, the coding symbol may be implemented to use various coding symbols, including but not limited to bar code symbols in linear, two-dimensional, or matrix format, PDF417, MicroPDF417, MaxiCode, Data Matrix, Aztec, Aztec Mesas, Code 49, EAN-UCC Composite, Snowflake, Dataglyphs, Code 39, Code 128, Codabar, UPC, EAN, Interleaved 2 of 5, Reduced Space Symbology, Code 93, Codablock F, and BC412, Postnet, Planet Code, British Post, Canadian Post, Japanese Post, KIX (Netherlands) Post, OCR-A, OCR-B, Code 11, UPC, EAN, MSI, Code 16K, etc.

In various embodiments, the mobile device includes an optical input device operable to illuminate the pattern of the coding symbol in order to capture an image for recognition and decoding purposes. However, it will be appreciated that any desired imager technology may be used that is suitable for use in detecting two-dimensional image information and generating an electrical output signal indicative of the data optically encoded therein. In various embodiments, the mobile device includes processing logic configured to receive coding symbol data from the optical input device. In certain of these embodiments, the processing logic is further configured to coding symbol data to decode product data stored in the coding symbol. In various embodiments, the mobile device includes a general purpose scanning application configured to scan and process the coding symbol. Skilled practitioners of the art will realize that many such embodiments are possible and the foregoing is not intended to limit the spirit, scope or intent of the invention.

The SKU data is then provided to the Picks System in step 1232, where it is processed to retrieve an associated product image in step 1234. The retrieved product image is then added to the Pick List and displayed within the user interface (UI) of the Pick System user's mobile device in step 1236. Thereafter, or once the photo of the displayed product has been added to the Pick List in step 1228, a determination is made in step 1238 whether to add another displayed product to the Pick List. If so, then the process is continued, proceeding with step 1216. Otherwise, or if it was determined in step 1214 to not add a displayed product to the Pick List, a determination is made in step 1240 whether to send a Pick List to a predetermined set of mobile device users. If not, then the process is continued, proceeding with step 1260.

However, if it was determined in step 1240 to send a Pick List to a set of mobile device users, then the Pick System user first selects the Pick List to send in step 1242 and the mobile device users to receive the Pick list in step 1244. The Pick List is then sent to the selected mobile device users in step 1246. Then, in step 1248, feedback and other responses are received on an ongoing basis from the mobile device user recipients of the Pick List.

A determination is then made in step 1250 whether to post a Pick List to a predetermined social media site. If not, then the process is continued, proceeding with step 1260. Otherwise, the Pick System user first selects the Pick List to post in step 1252 and the social media site to receive the Pick list in step 1254. The Pick List is then posted to the selected social media site in step 1256. Then, in step 1248, feedback and other responses related to the posted Pick List are received on an ongoing basis from users associated with the social media site. The process is then continued, proceeding with step 1260.

Figure 13:
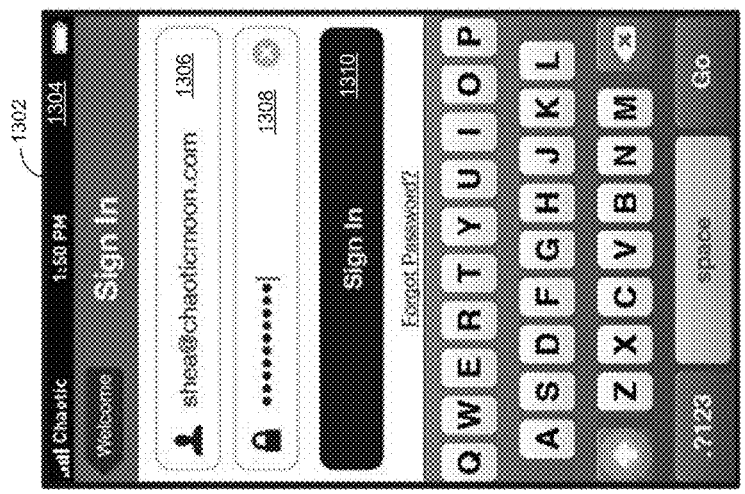
FIG. 13 shows a Pick System log-in window implemented in the UI of a mobile device.

FIG. 13 shows a Pick System log-in window implemented in the user interface (UI) of a mobile device implemented in accordance with an embodiment of the invention. In this embodiment, a Pick System user provides authentication credentials, such as their Pick System screen name 1306 and password 1308 with the UI 1304 of their mobile device 1302. Once entered, the authentication credentials are then submitted to the Pick System when the Pick System user selects the "Sign In" command button with a user gesture, such as a finger tap.

Figure 14:
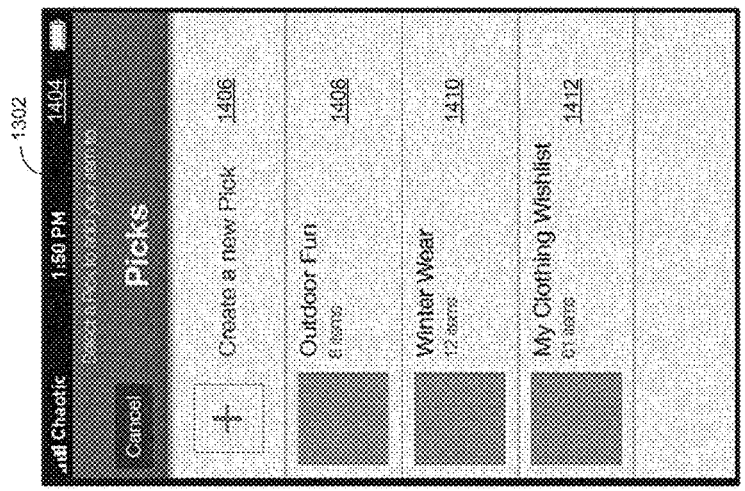
FIG. 14 shows a Pick List creation command button implemented in the UI window of a mobile device.

FIG. 14 shows a Pick List creation command button implemented in the UI window of a mobile device implemented in accordance with an embodiment of the invention. In this embodiment, a Pick System user is presented a plurality of existing Pick Lists 1408, 1410, 1412, and a "Create a New Pick" command button 1406 within the UI 1404 of their mobile device 1302. As described in greater detail herein, the Pick System user first selects an existing Pick List, such as Pick List 1408, 1410, 1412, or creates a new Pick List by selecting the "Create a New Pick" command button 1406 with a user gesture, such as a finger tap. The Pick System user can then add an existing image, or a photo, of a product displayed within a merchant's physical site to either a newly created or an existing Pick List 1408, 1410, 1412.

Figure 15:
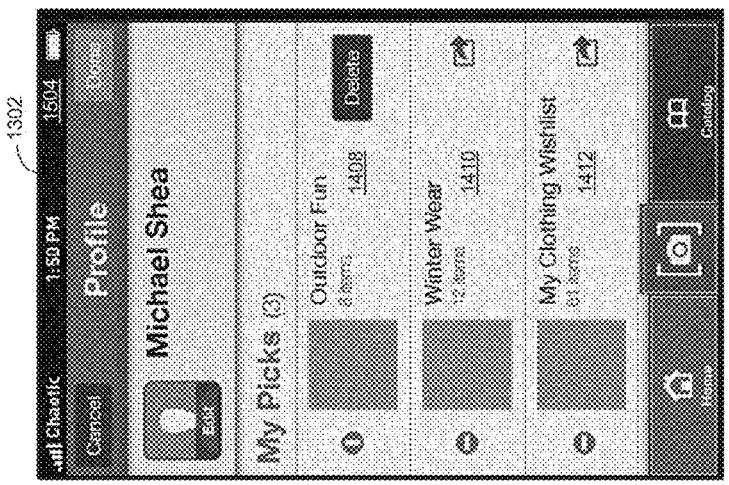
FIG. 15 shows a Pick List management window implemented in the UI of a mobile device.

FIG. 15 shows a Pick List management window implemented in the UI of a mobile device implemented in accordance with an embodiment of the invention. In this embodiment, a Pick System user is presented a plurality of existing Pick Lists 1408, 1410, 1412 within the UI 1504 of their mobile device 1302. As described in greater detail herein, the Pick System can perform Pick List management functions, such as "View Contents of a Pick List," "Delete a Pick List," "Add a Product to a Pick List," "Delete a Product from a Pick List," etc.

Figure 16:
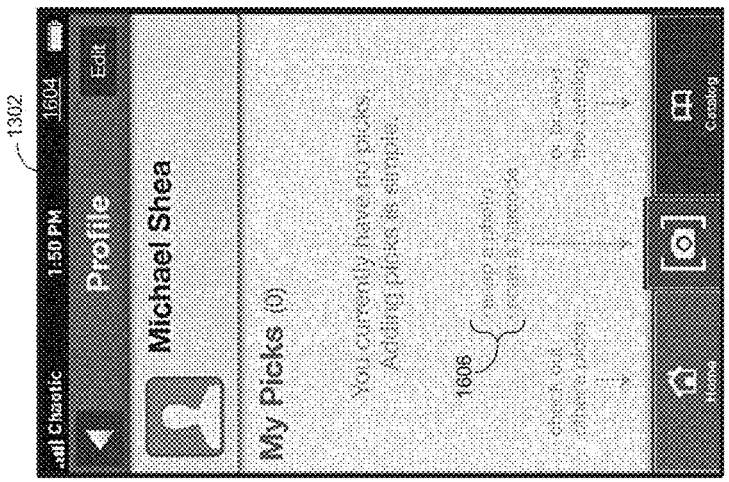
FIG. 16 shows a Pick List product addition window implemented in the UI of a mobile device.

FIG. 16 shows a Pick List product addition window implemented in the user interface (UI) of a mobile device implemented in accordance with an embodiment of the invention. In this embodiment, a Pick System user is provided prompts 1606 within the UI 1604 of their mobile device 1302 to initiate the provision of an existing product image, or to take a photo, of a product displayed at a merchant's physical site. As described in greater detail, the provided product image, or resulting photo, is then processed by the Pick System for addition to an existing or newly-created Pick List.

Figure 17:
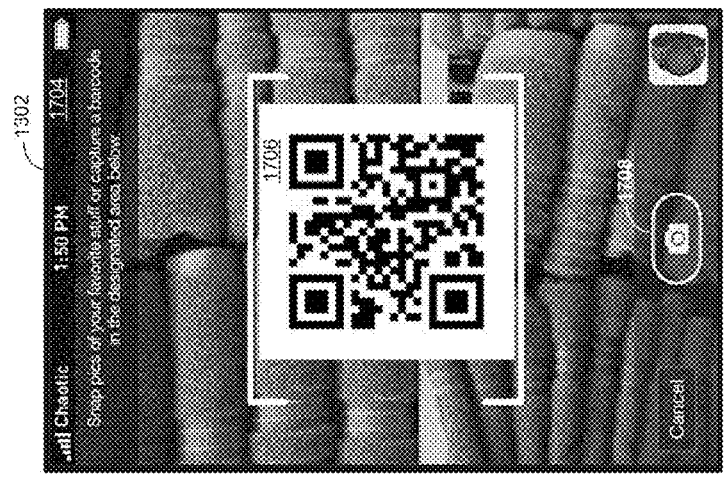
FIG. 17 shows the capture of a coding symbol associated with a product by a mobile device.

FIG. 17 shows the capture of a coding symbol associated with a product by a mobile device implemented in accordance with an embodiment of the invention. In this embodiment, a coding symbol 1706 associated with a product displayed within a merchant's physical site is displayed within the user interface (UI) 1704 of a Pick System user's mobile device. In this embodiment, the coding symbol 1706 is scanned by selecting the "Camera" icon 1708 through the use of a user gesture, such as a finger tap. As described in greater detail herein, the coding symbol 1706 is scanned and processed to generate stock keeping unit (SKU) data, which is then provided to the Pick System. As likewise described in greater detail herein, the Pick System processes the SKU data to find a product image of the displayed product.

Figure 18:
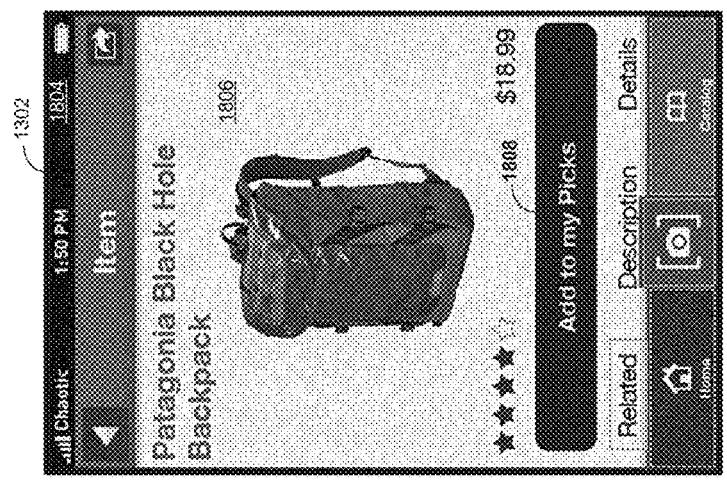
FIG. 18 shows a product image, and associated product details, corresponding to a coding symbol captured by a mobile device.

FIG. 18 shows a product image, and associated product details, corresponding to a coding symbol captured by a mobile device implemented in accordance with an embodiment of the invention. In this embodiment, a product image 1806, corresponding to a product displayed within a merchant's physical site, is provided by the Pick System for display within the user interface (UI) 1804 of a Pick System user's mobile device 1302. As shown in FIG. 18, and described in greater detail herein, the provided product image can then be added to an existing, or newly-created, Pick List by selecting the "Add to My Picks" command button 1808 through the use of a user gesture, such as a finger tap.

Figure 19A:
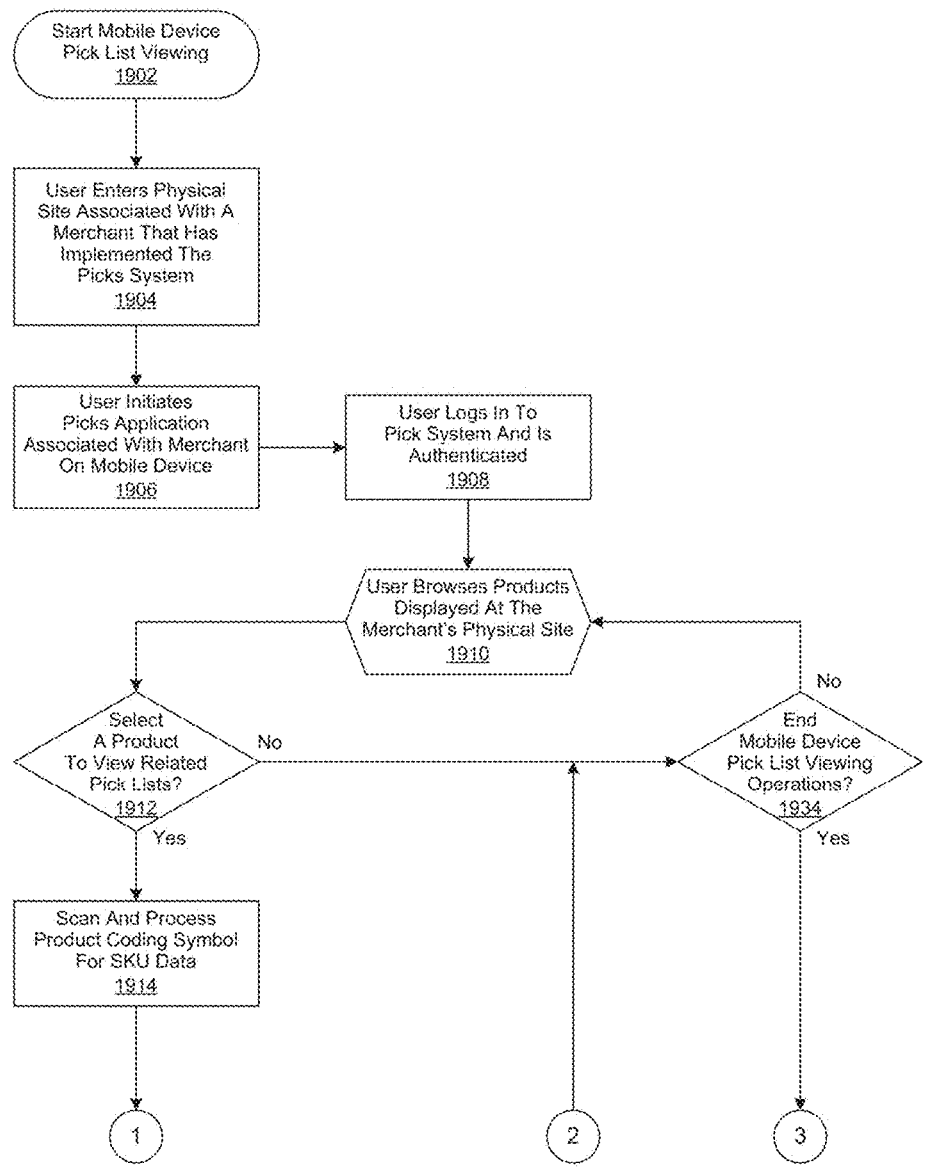
FIGS. 19a and 19b are a generalized flowchart of the performance of mobile device Pick List viewing operations.
Figure 19B:
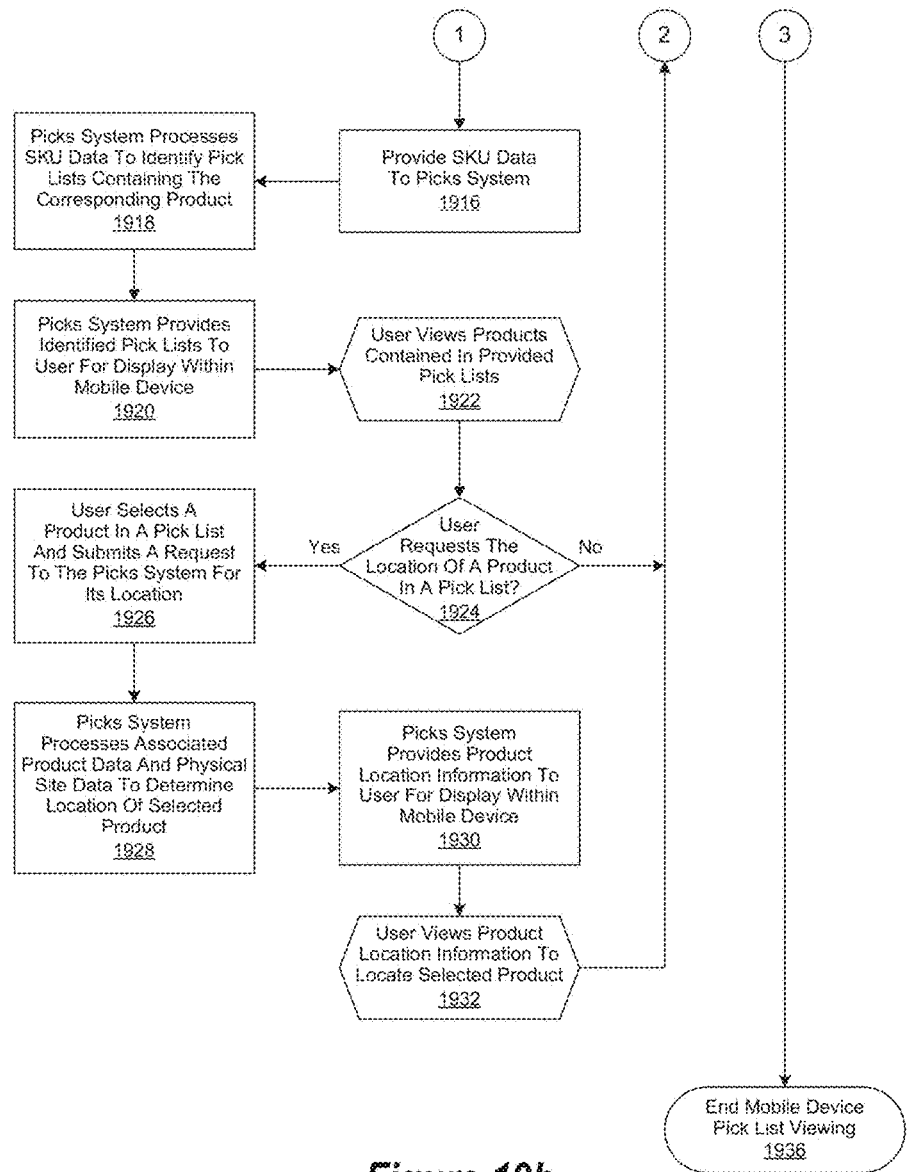

FIGS. 19*a* and 19*b* are a generalized flowchart of the performance of mobile device Pick List viewing operations implemented in accordance with an embodiment of the invention. In this embodiment, mobile device Pick List viewing operations are begun in step 1902, followed by a Pick System user entering a physical site associated with a merchant that has implemented the Pick System in step 1904. As an example, the physical site may be a retail or wholesale store. In step 1906, the Pick System user initiates a mobile Pick System application on their mobile device. In one embodiment, the mobile Pick System application is specific to a predetermined merchant that has implemented the Pick System, such as the merchant associated with the physical site. In another embodiment, the mobile Pick System application is configured to be specific to a predetermined set of merchants that have implemented the Pick System. In yet another embodiment, the mobile Pick System application is configured to support Pick System operations with any merchant that has implemented the Pick System.

The Pick System user then logs into the Pick System and is authenticated in step 1908. In various embodiments, the Pick System user is not required to be authenticated. In these embodiments, the Pick System user is not allowed to perform mobile device Pick List management operations described in greater detail herein. Once authenticated, of if authentication of the Pick system user is not required, the Pick System user browses products displayed at the merchant's physical site in step 1910, followed by a determination being made in step 1912 whether the Pick System user wishes to select a displayed product and view related Pick Lists. If not, then a determination is made in step 1934 whether to continue mobile device Pick List viewing operations. If so, then the process is continued, proceeding with step 1910. Otherwise, mobile device Pick List viewing operations are ended in step 1936.

However, if it was determined in step 1912 to select a displayed product and view related Pick Lists, then a coding symbol associated with a displayed product is scanned and processed as described in greater detail herein to generate stock keeping unit (SKU) data in step 1914. The resulting SKU data is provided to the Pick System in step 1916, where it is processed in step 1918 to identify Pick Lists that contain the product corresponding to the SKU data. The identified Pick Lists are then provided in step 1920 for display within the user interface (UI) of the Pick System user's mobile device.

Then, in step 1922, the Pick System user views the other products contained in the provided Pick Lists, followed by a determination being made in step 1924 whether to request the location of a predetermined product within one of the provided Pick Lists. If not, then the process is continued, proceeding with step 1934. Otherwise, the user selects a predetermined product in one of the provided Pick Lists and submits a request to the Pick System for its location in step 1926. In turn, the Pick System processes product data associated with the selected product, and data associated with the merchant's physical site, in step 1928 to determine the location of the selected product.

Once the location of the selected product is determined, it is provided in step 1930 to the Pick System user as product location information, which is displayed within the UI of the Pick System user's mobile device. The Pick System user then views the provided location information to locate the selected product in step 1932 and the process is continued, proceeding with step 1934. In various embodiments, the product location information includes the location of the product within the merchant's physical site. In certain of these embodiments, the product location information includes navigation information to assist the Pick System user in locating the product. In various embodiments, the location information includes information stating that the product is only available from the merchant's website. In certain of these embodiments, the Pick System provides ordering information to the Pick System user to assist in ordering the product from the merchant's web site.

Figure 20:
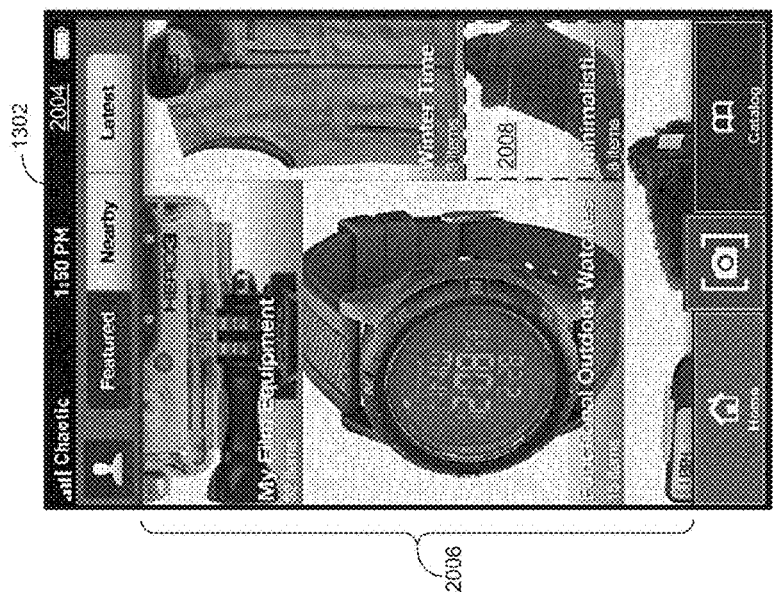
FIG. 20 shows the display of a plurality of Pick Lists corresponding to a product selected by a user within the UI of a mobile device.

FIG. 20 shows the display of a plurality of Pick Lists corresponding to a product selected by a user within the user interface (UI) of a mobile device implemented in accordance with an embodiment of the invention. In this embodiment, a Pick System user, as described in greater detail herein, selects a displayed product and submits a request to the Pick System to view Pick Lists that contain the product. In response, as likewise described in greater detail herein, the Pick System provides identified Pick Lists 2006, which are then displayed within the UI 2004 of the Pick System user's mobile device 1302. In turn, the Pick System user can then select provided Pick List, such as the "Minimalistic Camping Gear" Pick List 2008, to view the individual products it contains.

Figure 21:
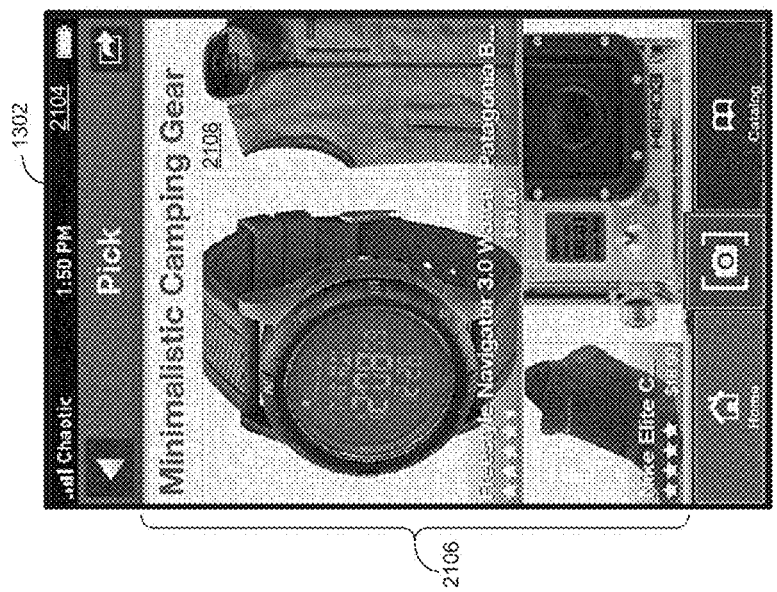
FIG. 21 shows the display of a plurality of products associated with a selected Pick List within the UI of a mobile device.

FIG. 21 shows the display of a plurality of products associated with a selected Pick List within the user interface (UI) of a mobile device implemented in accordance with an embodiment of the invention. In this embodiment, individual products 2106 contained in a previously selected Pick List, such as "Minimalistic Camping Gear" Pick List 2008 shown in FIG. 20, are displayed within the UI 2004 of the Pick System user's mobile device 1302.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implementable method for automating the provision and consumption of social media product recommendations in a mobile environment, the mobile environment comprising a mobile device, a cloud computing environment executing a Pick System and a merchant website executing on a merchant system, the merchant system communicating with the Pick System via a network, comprising:

presenting a user interface on the mobile device of a user, the user interface presenting the Pick system on the mobile device of the user, the Pick system being implemented to interact with the merchant website, the merchant website integrating Pick System functionality by including a merchant-specific Picks Javascript file in product detail pages of the merchant website, the Pick system allowing the user to create and manage collections of their favorite products using respective Pick Lists via the mobile device, the Pick system being implemented in the cloud computing environment, the Pick system comprising a content delivery network, the Pick Lists comprising content cached in and served from the content delivery network associated with the Pick System, the content delivery network storing product images, Pick List images, consolidated Picks Javascript and merchant product images within a Picks database, the Picks database storing large data sets within a plurality of database shards, each of the plurality of database shards corresponding to an individual partition within the Picks database;

receiving product identification data from the user, the product identification data provided through the use of the user interface of the mobile device and corresponding to a first product displayed at a physical site;

receiving user input data from the user, the user input data provided through the use of the user interface of the mobile device and comprising a request to associate the first product with a first Pick List, the first Pick List comprising a pictorial grouping of products that the user has selected, assembled and named via the Pick system;

processing via the Pick system the product identification data and the user input data to associate the first product with the first Pick List;

receiving Pick List association data from the user via the user interface of the mobile device, the Pick List association data creating a new Pick List and associating the first product with the new Pick List; and, displaying one or more of the first Pick List and the new Pick List within the user interface of the mobile device, the displaying being presented via a display of the mobile device and automating provision of social media product recommendations via the mobile device.

2. The computer-implementable method of claim 1, wherein the product identification data comprises one member of the set of:
stock keeping unit (SKU) data; and
a photograph of the first product.

3. The computer-implementable method of claim 2, wherein:
the SKU data and the photograph of the first product are generated through the use of the mobile device.

4. The computer-implementable method of claim 3, wherein:
the SKU data is generated by the mobile device processing a scanned image of a coding symbol associated with the first product.

5. The computer-implementable method of claim 1, further comprising:
receiving associated Pick List input data from a user, the associated Pick List input data provided through the use of the mobile device and comprising a request to provide a second Pick list containing the first product and a second product.

6. The computer-implementable method of claim 5, wherein:
the associated Pick List input data comprises SKU data associated with the first product.

7. The computer-implementable method of claim 5, further comprising:
processing the associated Pick List input data to provide the second Pick List.

8. The computer-implementable method of claim 7, wherein:
the first Pick List and the second Pick List is provided for display within a user interface (UI) of the mobile device from a server at a remote location.

9. The computer-implementable method of claim 8, wherein:
the first Pick List and the second Pick List is provided for display within a user interface (UI) of the mobile device by a service provider on an on-demand basis.

10. A system comprising:
a processor;
a data bus coupled to the processor; and
a non-transitory, computer-readable storage medium embodying computer program code for the provision and consumption of social media product recommendations in a mobile environment, the mobile environment comprising a mobile device, a cloud computing environment executing a Pick System and a merchant website executing on a merchant system, the merchant system communicating with the Pick System via a network, the non-transitory, computer-readable storage medium being coupled to the data bus, the computer program code interacting with a plurality of computer operations and comprising instructions executable by the processor and configured for:

presenting a user interface on the mobile device of a user, the user interface presenting the Pick system on the mobile device of the user, the Pick system being implemented to interact with the merchant website, the merchant website integrating Pick System functionality by including a merchant-specific Picks Javascript file in product detail pages of the merchant website, the Pick system allowing the user to create and manage collections of their favorite products using respective Pick Lists via the mobile device, the Pick system being implemented in the cloud computing environment, the Pick system comprising a content delivery network, the Pick Lists comprising content cached in and served from the content delivery network associated with the Pick System, the content delivery network storing product images, Pick List images, consolidated Picks Javascript and merchant product images within a Picks database, the Picks database storing large data sets within a plurality of database shards, each of the plurality of database shards corresponding to an individual partition within the Picks database;

receiving product identification data from the user, the product identification data provided through the use of the user interface of the mobile device and corresponding to a first product displayed at a physical site;

receiving user input data from the user, the user input data provided through the use of the user interface of the mobile device and comprising a request to associate the first product with a first Pick List, the first Pick List comprising a pictorial grouping of products that the user has selected, assembled and named via the Pick system;

processing via the Pick system the product identification data and the user input data to associate the first product with the first Pick List;

receiving Pick List association data from the user via the user interface of the mobile device, the Pick List association data creating a new Pick List and associating the first product with the new Pick List; and, displaying one or more of the first Pick List and the new Pick List within the user interface of the mobile device, the displaying being presented via a display of the mobile device and automating provision of social media product recommendations via the mobile device.

11. The system of claim 10, wherein the product identification data comprises one member of the set of:
stock keeping unit (SKU) data; and
a photograph of the first product.

12. The system of claim 11, wherein:
the SKU data and the photograph of the first product are generated through the use of the mobile device.

13. The system of claim 12, wherein:
the SKU data is generated by the mobile device processing a scanned image of a coding symbol associated with the first product.

14. The system of claim 10, further comprising:
receiving associated Pick List input data from a user, the associated Pick List input data provided through the use of the mobile device and comprising a request to provide a second Pick list containing the first product and a second product.

15. The system of claim 14, wherein:
the associated Pick List input data comprises SKU data associated with the first product.

16. The system of claim 14, further comprising:
processing the associated Pick List input data to provide the second Pick List.

17. The system of claim 16, wherein:
the first Pick List and the second Pick List is provided for display within a user interface (UI) of the mobile device from a server at a remote location.

18. The system of claim 17, wherein:
the first Pick List and the second Pick List is provided for display within a user interface (UI) of the mobile device by a service provider on an on-demand basis.

* * * * *